US006337730B1

(12) United States Patent
Ozaki et al.

(10) Patent No.: US 6,337,730 B1

(45) Date of Patent: Jan. 8, 2002

(54) NON-UNIFORMLY-RIGID BARRIER WALL SPACERS USED TO CORRECT PROBLEMS CAUSED BY THERMAL CONTRACTION OF SMECTIC LIQUID CRYSTAL MATERIAL

(75) Inventors: Masaaki Ozaki, Kariya; Koichi Miyashita, Nishio; Kenji Maekawa, Okazaki; Takahisa Kaneko, Chiryu; Naoki Matsumoto, Aichi-gun; Kazuhiro Inoguchi, Toyota, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/323,105

(22) Filed: Jun. 1, 1999

(30) Foreign Application Priority Data

Jun. 2, 1998 (JP) .......................................... 10-153233
Sep. 1, 1998 (JP) .......................................... 10-247537
Nov. 9, 1998 (JP) .......................................... 10-317983

(51) Int. Cl.[7] ...................... G02F 1/1339; G02F 1/1341

(52) U.S. Cl. ....................... 349/156; 349/184; 349/189

(58) Field of Search ................................ 349/156, 157, 349/189, 192, 184, 155, 158, 160, 18

(56) References Cited

U.S. PATENT DOCUMENTS 3,978,580 A * 9/1976 Leupp et al. ................. 29/592
5,400,157 A * 3/1995 Won ............................ 359/67
5,452,114 A * 9/1995 Hotta et al. ................... 359/75
5,499,128 A * 3/1996 Hasegawa et al. ............ 359/81
5,559,621 A 9/1996 Minato et al.
5,576,865 A 11/1996 Watanabe et al.
5,719,653 A * 2/1998 Minato et al. .............. 349/156
5,838,414 A * 11/1998 Lee ............................ 349/157
6,067,144 A * 5/2000 Murouchi .................. 349/156

FOREIGN PATENT DOCUMENTS

JP 6-68589 8/1994

* cited by examiner

*Primary Examiner*—Toan Ton
*Assistant Examiner*—Andrew Schechter
(74) *Attorney, Agent, or Firm*—Pillsbury Winthrop L.L.P.

(57) ABSTRACT

According to this liquid crystal cell, a vacuum to be established between two electrode substrates as a result of the volume shrinkage of a liquid crystal having a high viscosity at the room temperature can be damped by communicating between two of a plurality of filling portions formed between two electrode substrates by a plurality of barrier walls through the intervening barrier walls. An anti-ferroelectric liquid crystal (AFLC) is used as the liquid crystal. The liquid crystal cell has a lower electrode substrate and an upper electrode substrate, between which a smectic liquid crystal is disposed together with a plurality of barrier walls on the inner side of a band seal. Each barrier wall has through holes to communicate between the two filling portions located on the two sides of the barrier walls.

25 Claims, 17 Drawing Sheets

NON-UNIFORMLY-RIGID BARRIER WALL SPACERS USED TO CORRECT PROBLEMS CAUSED BY THERMAL CONTRACTION OF SMECTIC LIQUID CRYSTAL MATERIAL

CROSS REFERENCE TO RELATED APPLICATION

This application is based on Japanese Patent Application Nos. Hei. 10-153233 filed on Jun. 2, 1998, Hei. 10-247537 filed on Sep. 1, 1998, and Hei. 10-317983 filed on Nov. 9, 1998, the contents of which are incorporated herein by reference.

BACKGROUND OF THE PRESENT INVENTION

1. Field of the Present Invention

The present invention relates to a liquid crystal cell to be suitably adopted in a liquid crystal display device or the like, and a process for manufacturing the liquid crystal cell.

2. Description of the Related Art

In recent years, the liquid crystal cell is utilized as a display element for a TV set, a personal computer or a work station, or a display element for a watch, a calculator or a measurement device because it is suited for a light weight and for a thin shape.

This display element is caused to transmit, reflect or shade a light mainly by utilizing the shuttering action of the liquid crystal.

The liquid crystal to be used in the display element is represented by a nematic liquid crystal or a smectic liquid crystal.

A conventional liquid crystal cell has a cell structure, as shown in FIG. 22. This liquid crystal cell is constructed by interposing a seal 903 in a band shape between the outer peripheral portions of two parallel electrode substrates 901 and 902, by providing a number of spherical spacers 904 between the two electrode substrates 901 and 902 on the inner peripheral sides of the seal 903, and by filling a liquid crystal through a liquid crystal filling port of the seal 903.

Here, the electrode substrate 901 is constructed by laminating a plurality of transparent electrodes 901*b*, a (not-shown) insulating film and an orientation film 901*c* on the inner surface of a glass substrate 901*a*. On the other hand, the electrode substrate 902 is constructed by laminating a plurality of transparent electrodes 902*b*, a (not-shown) insulating film and an orientation film 902*c* on the inner surface of a glass substrate 902*a*. Here, the plurality of transparent electrodes 902*b* are arranged to intersect the plurality of transparent electrodes 901*b*. Reference numeral 905 designates a polarizing sheet in FIG. 22.

When the liquid crystal cell is made of a nematic liquid crystal, if caused to establish a flow in the nematic liquid crystal by a local pressure or impact from the outside, its orientation state is restored after releasing the pressure or impact.

When the liquid crystal cell is made of a smectic liquid crystal, however, if an orientation defect in the smectic liquid crystal or a disturbance in the liquid crystal layer structure is caused by a local pressure or impact from the outside, its orientation state is not restored even after releasing the local pressure or impact.

On the other hand, when the liquid crystal cell is made of a smectic liquid crystal, an orientation disturbance or a defect is likely to occur in the smectic liquid crystal at the periphery of the spherical spacer, and the display characteristics of the liquid crystal cell are deteriorated.

For this, it is conceivable (as disclosed in Japanese Patent Application Laid-Open No. 7-318912 or U.S. Pat. No. 5,559,621) that the liquid crystal cell using the smectic liquid crystal is given a cell structure, as shown in FIG. 23.

This liquid crystal cell is constructed by interposing a seal 908 in a band shape between two electrode substrates 906 and 907 parallel to each other, providing a plurality of barrier walls 909 between the two electrode substrates 906 and 907 on the inner peripheral side of the seal 908 and filling a smectic liquid crystal through a liquid crystal filling port of the seal 908.

Here, the electrode substrate 906 is constructed by laminating a plurality of transparent electrodes 906*b*, an insulating film 906*c* and an orientation film 906*d* on the inner surface of a glass substrate 906*a*. On the other hand, the electrode substrate 907 is constructed by laminating a plurality of transparent electrodes 907*b*, a (not-shown) insulating film and an orientation film 907*c* on the inner surface of a glass substrate 907*a*.

Each barrier wall 909 is clamped between the orientation film 906*d* of the electrode substrate 906 and the glass substrate 907*a* of the electrode substrate 907 so that it is positioned to lie between the adjoining two of the plurality of orientation films 907*c*.

According to this liquid crystal cell, each barrier wall 909 exhibits a rigidity enough to prevent a defect in the liquid crystal layer of the smectic liquid crystal even a local pressure or impact is applied to the liquid crystal cell from the outside. In the presence of a linear space between the individual barrier walls 909, it is possible to suppress the disturbance in the orientation of the smectic liquid crystal.

However, in the liquid crystal cell of FIG. 23, at a cooling step of cooling the liquid crystal cell after the two electrode substrates 906 and 907 are filled with the smectic liquid crystal, a zigzag orientation defect A, as shown in FIGS. 24, 25, appears in the liquid crystal layer of the smectic liquid crystal.

This point will be described in detail. When the smectic liquid crystal is used as the liquid crystal, it is necessary to fill the smectic liquid crystal under the circumstance of a temperature (at 80 to 120° C.) corresponding to an isotropic phase. After this filling operation, the liquid crystal filling port of the liquid crystal cell is plugged, and the liquid crystal cell is cooled.

In FIG. 26, a “graph a” plots changes in a volume change rate against a temperature of the cell structure of a liquid crystal cell when the change at 80° C. is “1”, and a “graph b” plots changes in the volume change rate against a temperature of the smectic liquid crystal.

It is found from these two “graph a” and “graph b” that the coefficient of thermal expansion of the smectic liquid crystal is considerably larger than that of the cell structure. Therefore, after the cooling operation, the smectic liquid crystal shrinks more than the cell structure. This means that the volume shrinkage rate of the smectic liquid crystal is considerably larger than that of the cell structure.

Accordingly, the smectic liquid crystal is pulled by the inner surface of the electrode substrate under its surface tension so that this tension generates a stress in the smectic liquid crystal. As a result, an orientation defect A, as shown in FIGS. 24 and 25, is generated in the liquid crystal layer of the smectic liquid crystal.

If the space between the adjoining two barrier walls 909 is enlarged in the liquid crystal cell of FIG. 23, it is possible to prevent the occurrence of the orientation defect A of the liquid crystal layer, which might otherwise be caused by the difference between the volume shrinkage of the smectic liquid crystal and the volume shrinkage of the cell structure.

However, if the space of the individual barrier walls 909 is taken widely by every two or three of the plurality of transparent electrodes 907*b*, the dielectric constants between the two electrode substrates 906 and 907 are different from each other at the portions with and without the barrier walls 909 of the two electrode substrates 906 and 907.

As a result, a phenomenon to invite deterioration in the display characteristics such as the crosstalk occurs at the time of driving the liquid crystal cell. That is, in order to prevent this phenomenon, the space of the individual barrier walls 909 has to be so narrowed that the barrier walls 909 are provided for every transparent electrode 907*b*.

Other problems on the liquid crystal cell, as shown in FIG. 23, will be described with reference to FIGS. 27 to 29. Here, FIG. 27 is a top plan view of FIG. 23, and FIG. 28 is a section taken along line XXVIII—XXVIII of FIG. 27. In FIG. 28, there are omitted the transparent electrodes 906*b* and 907*b*, the insulating film 906*c* and the orientation films 906*d* and 907*c*.

In the liquid crystal cell shown in FIG. 23, the phase structure of the smectic liquid crystal makes a complicated phase transition from the liquid phase (i.e., the isotropic phase) in a high temperature state to, for example, a smectic A phase→a chiral smectic C phase→a chiral smectic CA phase, as the temperature lowers.

According to this transition in the phase structure of the smectic liquid crystal, this smectic liquid crystal shrinks in its volume, as shown in FIGS. 27 and 28, to generate a defect that bubbles 910 are produced in the liquid crystal cell.

That is, when a volume of the smectic liquid crystal shrinks, the liquid crystal cell of a structure having the plurality of barrier walls 909 interposed between the two electrode substrates 906 and 907 is disabled to change the space between the two electrode substrates 906 and 907 by the plurality of barrier walls 909.

As a result, a filling portion 911 filled with the smectic liquid crystal in the liquid crystal cell is evacuated to be negative pressure to gasify the gaseous component left in the liquid crystal cell so that the bubbles 910 are produced.

This difficulty is prominent especially when the liquid crystal cell having been filled with the smectic liquid crystal is left in a low temperature state (e.g., −20° C.).

This bubbling phenomenon will be described in more detail. The smectic liquid crystal has a high viscosity at the room temperature so that it cannot be injected as it is into the liquid crystal cell.

Therefore, the liquid crystal cell is heated to change the phase structure of the smectic liquid crystal into a liquid phase before the liquid crystal cell is filled with the smectic liquid crystal.

After filling operation, the smectic liquid crystal is slowly cooled to the room temperature so that its orientation may be improved. However, according to this slow cooling, the volume of the smectic liquid crystal shrinks, as indicated by a "graph L" of FIG. 29. Therefore, even when the smectic liquid crystal reaches the room temperature, it is thought that the inside of the liquid crystal cell is evacuated to be negative pressure as a result of the volume shrinkage of the smectic liquid crystal.

It would be better if the vacuum could be damped by deforming the liquid crystal cell with it, but the electrode substrates 906 and 907 are hard to deform in the presence of the plurality of barrier walls 909. This makes it impossible to damp the vacuum in the liquid crystal cell so that the bubbles are produced in the liquid crystal cell.

The situations in which the bubbles 910 are produced will be described in more detail. These bubbles 910 are linearly produced, as shown in FIGS. 27 and 28, at the individual widthwise centers of the plurality of filling portions 911 formed between the two electrode substrates 906 and 907 by the plurality of barrier walls 909, and in the longitudinal direction of the individual filling portions.

That is, it is thought that the linear bubbles 910 are produced at the widthwise centers of the individual filling portions 911 because the inside of the liquid crystal cell is evacuated by the volume shrinkage of the smectic liquid crystal in the individual filling portions 911 and because the excellent wettability between the smectic liquid crystal and the individual barrier walls made of a proper material establishes a force to attract the smectic liquid crystal toward the individual barrier walls.

Thus, in the display area of the liquid crystal cell, a linear display occurs due to each of the linear bubbles 910.

As a countermeasure against the aforementioned bubble production, it is conceivable to enhance the filling density of the liquid crystal cell with the smectic liquid crystal. This concept is exemplified by a method of filling the liquid crystal cell with the smectic liquid crystal by a pressure, as disclosed in Japanese Patent Laid-Open No. 6-67136 or U.S. Pat. No. 5,576,865. However, this disclosure has been insufficient for preventing the bubble production.

This point will be described in detail. The bubbles or the unfilled regions of the smectic liquid crystal are surely reduced at the room temperature, but the liquid crystal cell may be used at 0° C. or lower. Therefore, if the liquid crystal cell is exposed to this low temperature circumstance, the volume of the smectic liquid crystal further shrinks, as indicated by the graph L in FIG. 29, so that the inside of the liquid crystal cell is evacuated to be negative pressure. This evacuation is thought to produce the linear bubbles in the liquid crystal cell. Moreover, the bubbles thus once produced do not disappear but remain even if the temperature of the liquid crystal cell is returned to the room temperature, to cause the display defect in the display area (i.e., the area enclosed by single-dotted lines in FIG. 27) of the liquid crystal cell.

SUMMARY OF THE PRESENT INVENTION

To solve the problems thus far described, the present invention has a first object to provide a liquid crystal cell in which a stress generated in a liquid crystal cell can be reduced.

The present invention has a second object to provide a liquid crystal cell in which a vacuum to be established between two electrode substrates as a result of the volume shrinkage of a liquid crystal having a high viscosity at the room temperature can be damped by communicating between two of a plurality of filling portions formed between two electrode substrates by a plurality of barrier walls through the intervening barrier walls.

Moreover, the present invention has a third object to provide a liquid crystal cell, in which the individual barrier walls are given a proper flexibility for reducing the stress generated in the liquid crystal due to the difference in the volume shrinkage between the liquid crystal and the two electrode substrates in accordance with the cooling after the filling of the space between the two electrode substrates with the liquid crystal by devising the structure of the plurality of barrier walls between the two electrode substrates, and a process for manufacturing the liquid crystal cell.

To achieve the objects, the present invention comprises: two electrode substrates; a band seal interposed between the two electrode substrates at the peripheral edges of the same; a plurality of barrier walls clamped on the inner peripheral side of the seal and between the two electrode substrates at a space from each other and in parallel with each other for forming a plurality of filling portions; and a liquid crystal filling the filling portions between the two electrode substrates through the seal.

Moreover, the pluralities of barrier walls have through holes formed to communicate between the adjoining individual two of the filling portions.

When the individual filling portions between the two electrode substrates of the liquid crystal cell thus constructed are to be filled under a vacuum with a liquid crystal in a soft state, the space between the two electrode substrates is kept unvaried by the individual barrier walls so that the two electrode substrates cannot be deformed to establish vacuums in the individual filling portions even if the liquid crystal is caused to shrink in its volume by the temperature.

Since the individual through holes are formed in the individual barrier walls, the liquid crystal portion in the two filling portions adjoining each other through the barrier walls flows to meet each other through the individual through holes of the barrier walls thereby to damp the vacuums in the individual filling portions.

When the liquid crystal in the individual filling portions shrinks in its volume, the volume of the bubbles in the vicinity of the inner surface of the seal increases with the vacuums because the space between the two electrode substrates is kept invariable by the individual barrier walls. That is, the space between the two electrode substrates cannot be varied so that the volume of the bubbles in the vicinity of the inner surface of the seal increases by the volume shrinkage of the liquid crystal to act in the direction to damp the vacuums.

As a result, the vacuums in the individual filling portions are damped so satisfactory that the linear bubbles in the display area of the liquid crystal cell can be prevented in advance from being produced.

In order to achieve the above-specified objects, another aspect of the present invention comprises: two electrode substrates; a band seal interposed between the two electrode substrates at the peripheral edges of the same; a plurality of barrier walls clamped on the inner peripheral side of the seal and between the two electrode substrates in parallel with each other; and a liquid crystal filling between the two electrode substrates via said seal.

In this liquid crystal cell, each of the plurality of barrier walls has a lower rigidity in at least its portion than that of its other portion.

A portion with a lower rigidity in each barrier wall is thus deformed even if the liquid crystal cell is caused to shrink in its volume by the temperature change. Then, the space between the two electrode substrates accordingly narrows while satisfactorily suppressing the appearance of the stress, which might otherwise be caused by the volume shrinkage.

As a result, even if the liquid crystal shrinks in its volume, no orientation defect occurs in the liquid crystal, but the display of the liquid crystal cell can be retained satisfactory.

According to the present invention, at a barrier wall forming step, a plurality of barrier walls are individually formed in a laminar shape of a resist material as first and second barrier wall portions having different rigidities in their height direction on the inner surface of the one or other electrode substrate.

As a result, at a subsequent cooling step, even if the liquid crystal is cooled to shrink in its volume, the less rigid one of the first and second barrier walls is accordingly deformed. This makes it possible to suppress the establishment of the stress, which is likely to appear in the liquid crystal in accordance with the volume shrinkage and to prevent the orientation defect of the liquid crystal.

In a liquid crystal cell according to another aspect of the present invention, the plurality of barrier walls interposed between the two electrode substrates in parallel with each other include: individual support barrier walls for supporting the space between the two electrode substrates; and at least one seated barrier wall seated on the inner surface of the other of the electrode substrate at a space between the support barrier walls from the inner surface of one of the two electrode substrates.

As a result, the space between the two electrode substrates is so enlarged at the portion of one electrode substrate between the individual support barrier walls as to facilitate the elastic deformation of the portion between the individual support barrier walls.

Even the liquid crystal filling up the liquid crystal cell causes a volume shrinkage due to the temperature change, therefore, the space between the two electrode substrates accordingly narrows while satisfactorily suppressing the appearance of the stress, as might otherwise be caused by the volume shrinkage.

As a result, even if the liquid crystal shrinks in its volume, no orientation defect occurs in the liquid crystal, but the display of the liquid crystal cell can be retained satisfactory.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE EMBODIMENTS

[First Embodiment]

A first embodiment of the present invention will be described with reference to FIGS. 1 to 7.

Figure 1:
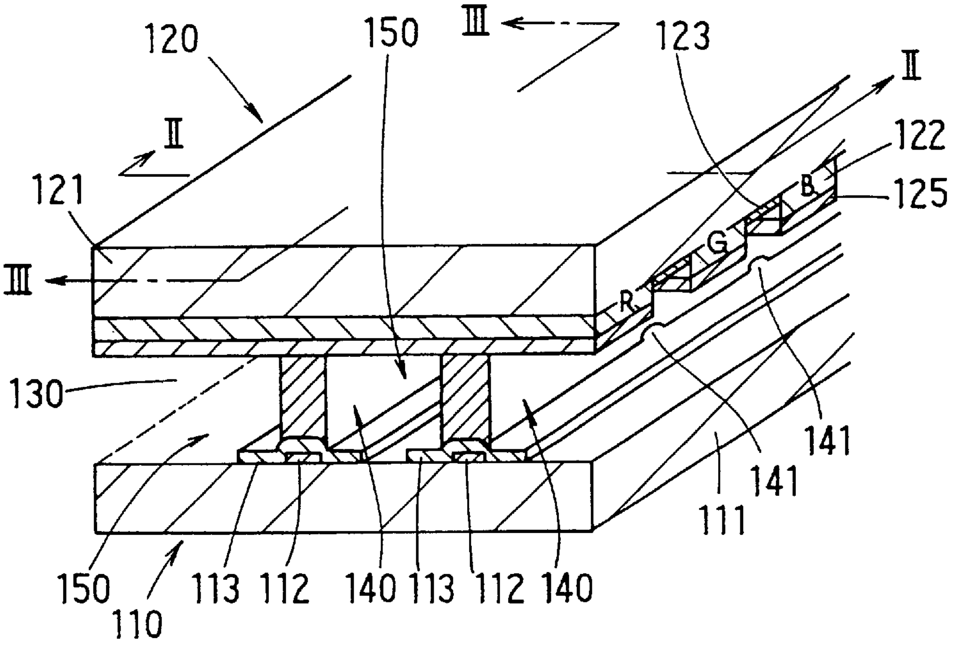
FIG. 1 is a perspective view showing a portion of a liquid crystal cell of a first embodiment according to the present invention.
Figure 2:
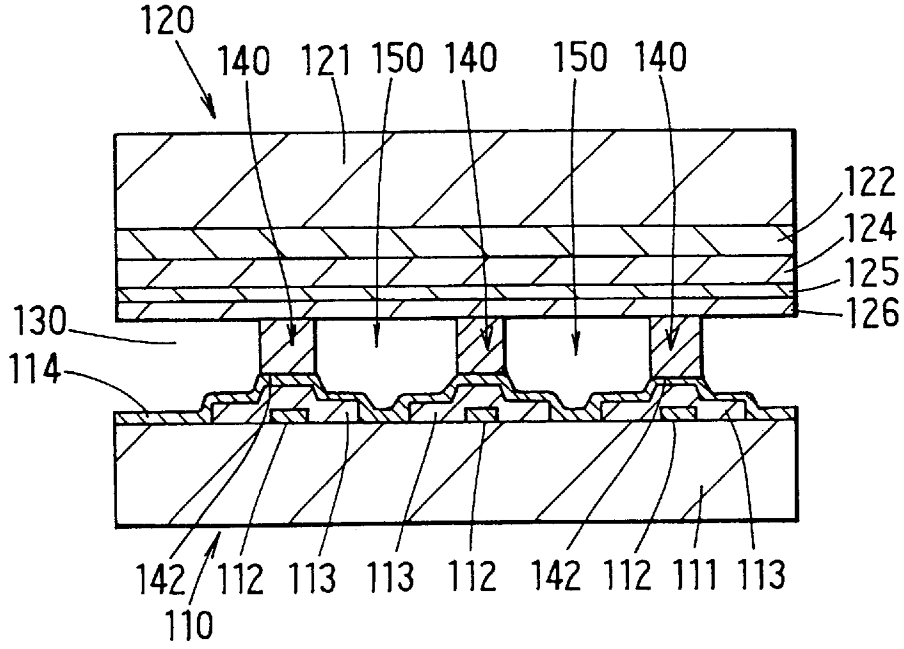
FIG. 2 is a section view taken along line II—II of FIG. 1.
Figure 3:
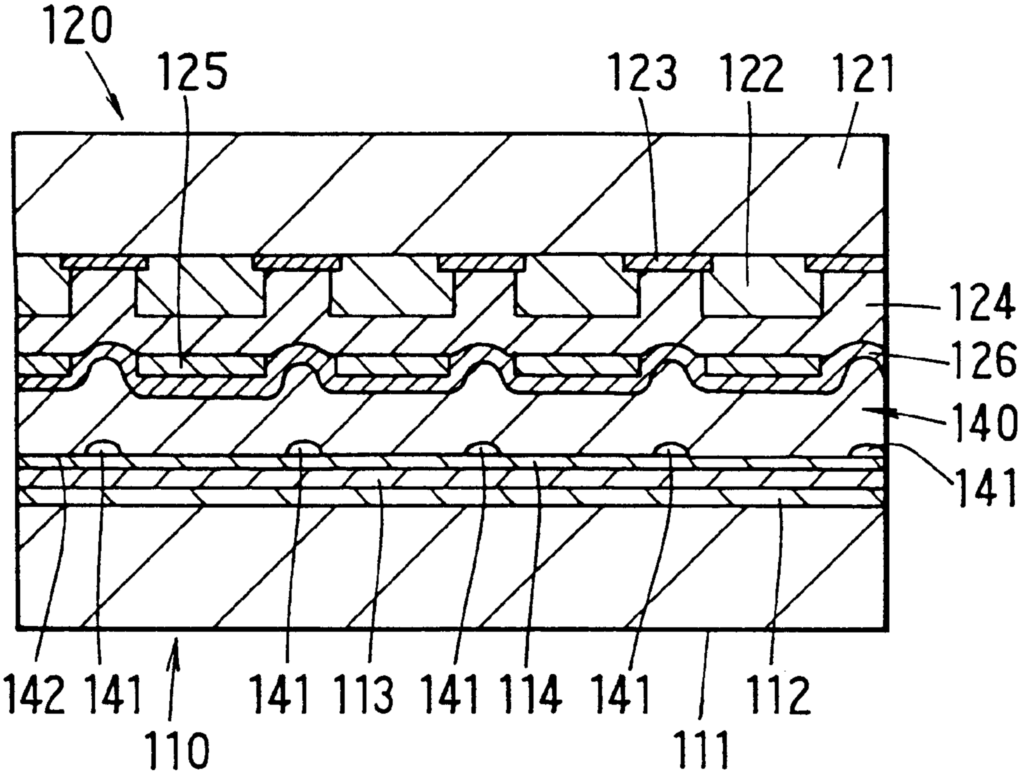
FIG. 3 is a section view taken along line III—III of FIG. 1.

FIGS. 1 to 3 show a first embodiment of a liquid crystal cell according to the present invention.

Figure 7:
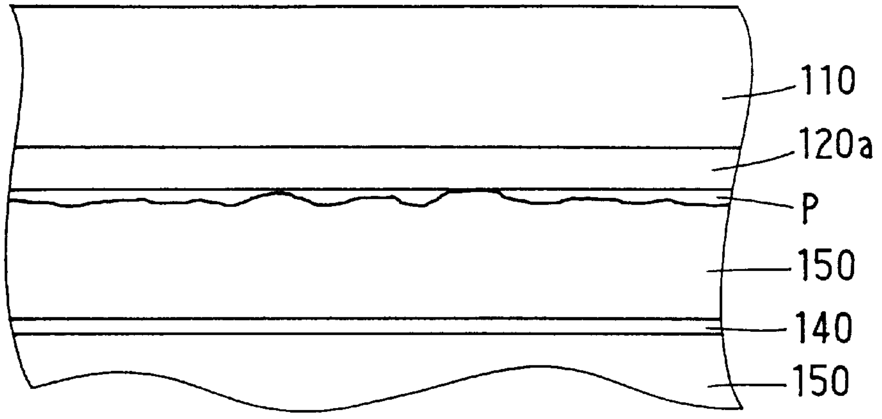
FIG. 7 is a top plan view of a portion and shows the state of bubbles produced in the vicinity of the inner circumference of a seal at a liquid crystal filling step of FIG. 4, with the upper electrode substrate being removed.

The liquid crystal cell is provided with a lower electrode substrate 110 and an upper electrode substrate 120, between which a smectic liquid crystal 130 is disposed together with a plurality of barrier walls 140 on the inner side of a band seal 120*a* (as referred to FIG. 7). Here, the smectic liquid crystal 130 is exemplified by a ferroelectric liquid crystal (FLC) or an anti-ferroelectric liquid crystal (AFLC). On the other hand, the smectic liquid crystal 130 may be replaced by a liquid crystal having similar viscosity characteristics such as a liquid crystal having a high viscosity at the room temperature.

The lower electrode substrate 110 is constructed by forming a plurality of metal electrodes 112, a plurality of transparent electrodes 113 and an orientation film 114 in this order on the inner surface of a transparent substrate 111. Here, each metal electrode 112 is formed between back face of the widthwise central portion of the corresponding transparent electrode 113 and the inner surface of the transparent substrate 111 and in the longitudinal direction of the corresponding transparent electrode 113. In this way, each metal electrode 112 lowers the internal resistance of each corresponding transparent electrode 113. Here, the orientation film 114 is omitted from FIG. 1. The electrode substrate 110 corresponds to a scanning electrode substrate.

On the other hand, the upper electrode substrate 120 is constructed by forming a plurality of color filter layers 122, a plurality of black mask layers 123, an over coat layer 124, a plurality of transparent electrodes 125 and an orientation film 126 in this order on the inner surface of a transparent substrate 121.

Here, the plurality of color filter layers 122 and the plurality of black mask layers 123 are formed alternately of each other in parallel along the inner surface of the transparent substrate 121. Each transparent electrode 125 faces the corresponding color filter layer 122 through the over coat layer 124 and extends along the corresponding color filter layer 122.

The plurality of transparent electrodes 125 are arranged to extend at a right angle with respect to the plurality of transparent electrodes 113 to construct a plurality of matrix pixels together with the smectic liquid crystal 130. Here, the over coat layer 124 and the orientation film 126 are omitted from FIG. 1. The electrode substrate 120 corresponds to a signal electrode substrate.

Each barrier wall 140 faces each corresponding metal electrode 112 through the widthwise central portion of each corresponding transparent electrode 113 and extends in a stripe shape in the longitudinal direction of the metal electrode 112. Here, each barrier wall 140 has the same width as that of each corresponding metal electrode 112.

As a result, the plurality of barrier walls 140 are closely clamped between the two electrode substrates 110 and 120 to form a plurality of filling portions 150 to keep an equal space between the two electrode substrates 110 and 120 and to enhance the resistance to vibration and shock as the liquid crystal cell.

On the other hand, each barrier wall 140 is provided, as shown in FIG. 3, with a through hole 141 which is formed along the region between the two of the color filter layers 122 and in the back face 142 of each barrier wall 140 over the inner face (as located on the side of the smectic liquid crystal 130) of the orientation film 114.

As a result, the through holes 141 are formed in the number corresponding to that of the regions between the individual color filter layers 122 and in the widthwise direction of the barrier walls to communicate between the two filling portions 150 located on the two sides of the barrier walls.

A process for manufacturing the liquid crystal cell thus constructed will be described with reference to FIGS. 4 and 5.

Figure 4:
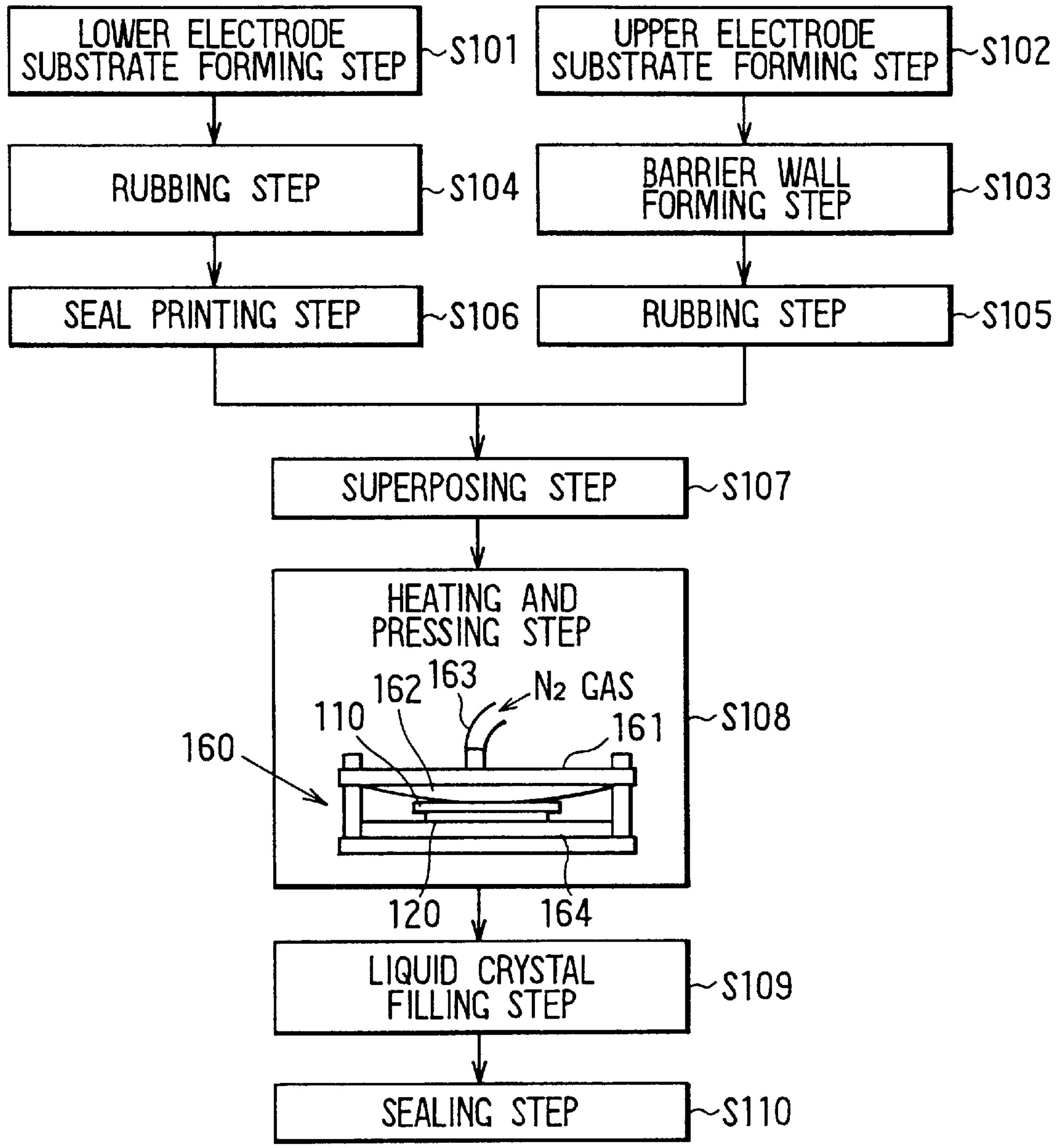
FIG. 4 is a flow chart showing a process for manufacturing the liquid crystal cell of FIG. 1.

At a lower electrode substrate forming step S101 of FIG. 4, the lower electrode substrate 110 thus constructed is formed.

Next, an upper electrode substrate forming step S102 will be described with reference to FIGS. 4 and 5.

Figure 5:
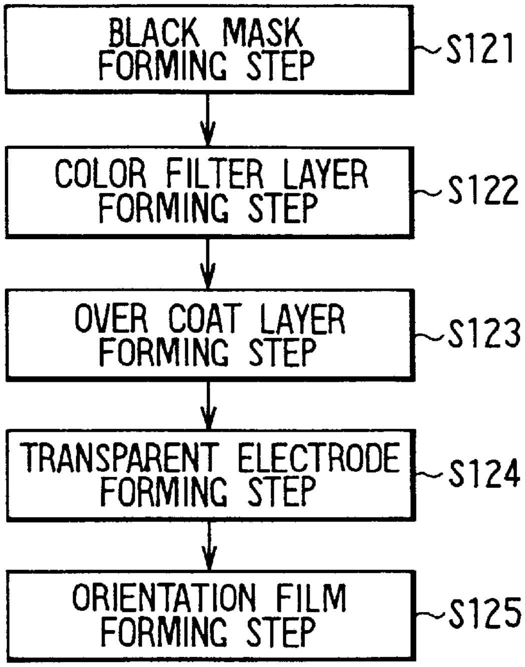
FIG. 5 is a flow chart showing a detailed process of an upper electrode substrate forming step of FIG. 4.

First of all, at a black mask forming step S121 of FIG. 5, the plurality of black mask layers 123 are formed in parallel at a predetermined space on the inner surface of the transparent substrate 121.

Next, at a color filter layer forming step S122, the plurality of color filter layers 122 are formed on the inner surface of the transparent substrate 121 individually between the adjoining two of the plurality of black mask layers 123 and in the longitudinal direction of the black mask layers 123.

After this, at an over coat forming step S123, the over coat layer 124 is formed on the inner surface of the transparent substrate 121 through the plurality of color filter layers 122 and the plurality of black mask layers 123.

Then, at a transparent electrode forming step S124, each transparent electrode 125 is so formed along each corresponding color filter layer 122 as to face the color filter layer 122 through the over coat layer 124.

After this, at an orientation film forming step S125, the orientation film 126 is formed on the over coat layer 124 through the individual transparent electrodes 125.

After the end of this upper electrode substrate forming step S102, at a barrier wall forming step S103 of FIG. 4, the plurality of barrier walls 140 are formed on the inner surface of the upper electrode substrate 120, as follows.

Specifically, a photoresist material is applied to a thickness of about 1.6 microns to the whole inner surface of the upper electrode substrate 120 including the inner surface of the orientation film 126 thereby to form a photoresist film. Then, this photoresist film is subjected to an exposing/developing treatment to a predetermined pattern (i.e., a pattern corresponding to the plurality of mutually parallel barrier walls 140 and the plurality of mutually parallel metal electrodes 112) by a photolithographic method to form the plurality of barrier walls 140 on the inner surface of the upper electrode substrate 120.

At this time, those regions of the resist film, which correspond to the grooves between the adjoining two of the color filter layers 122, are recessed to a depth of the recesses which are formed after the formation of the over coat layer 124.

These recesses have a depth ranging from about 0.5 to 1.0 microns although different depending upon the structure of the electrode substrate 120 forming the color filter layers 122, the black mask layers 123, the over coat layer 124 and the transparent electrodes 125.

Here in this embodiment: the black mask layers 123 are given a thickness of about 0.2 microns; the color filter layers 122 are given a thickness of about 1.6 microns; the over coat layer 124 is given a thickness of about 1.2 microns; and the transparent electrodes 125 are given a thickness of about 2,000 angstroms.

Next, the inner surface of the orientation film 114 of the lower electrode substrate 110 is subjected to a rubbing treatment at a rubbing step S104, and the inner surface of the orientation film 126 of the upper electrode substrate 120 is subjected to a rubbing treatment at a rubbing step S105 through the plurality of barrier walls 140. Here, the direction to rub the two orientation films 114 and 126 regulates the orientation direction of the smectic liquid crystal 130 when the two electrode substrates 110 and 120 are overlapped.

At these rubbing steps, the rubbing directions of the individual orientation films 114 and 126 are desired to be in parallel to the longitudinal direction of the individual barrier walls 140 and either in the same direction or in the opposite directions, as will be reasoned in the following.

Figure 27:
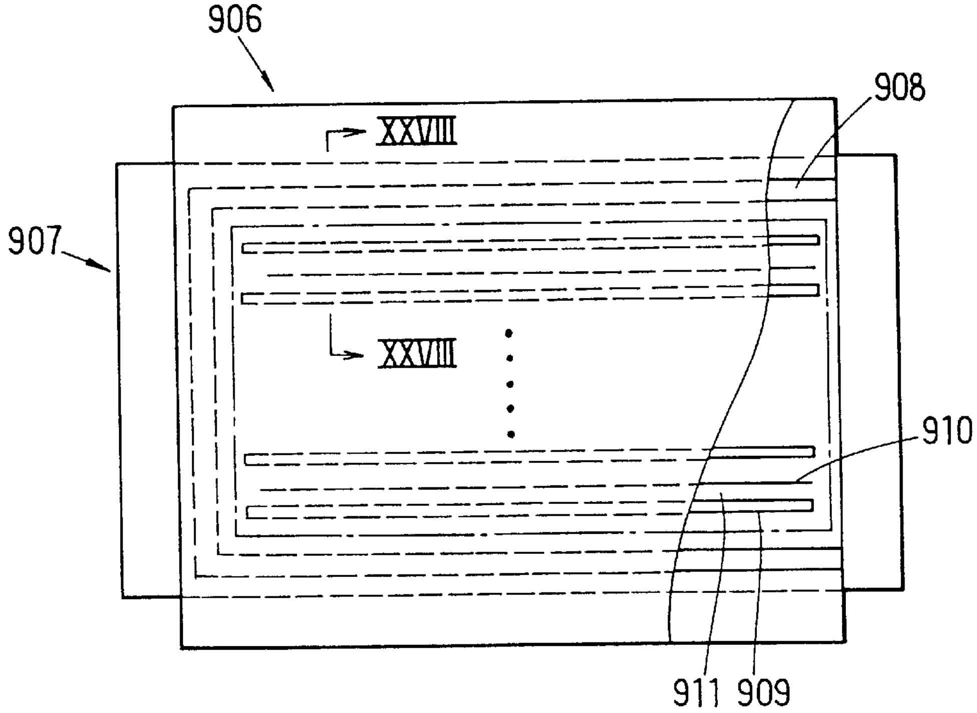
FIG. 27 is a top plan view of a conventional liquid crystal cell.
Figure 28:
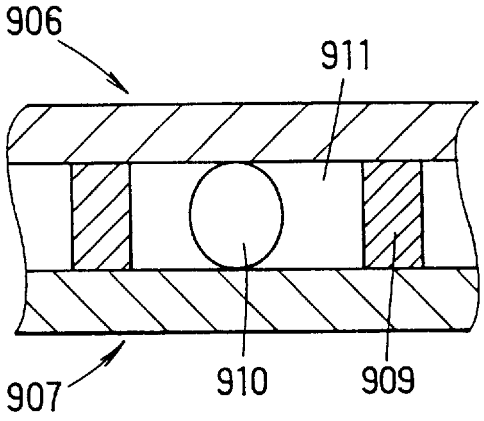
FIG. 28 is a section of a portion taken along line XXVIII—XXVIII of FIG. 27.
Figure 29:
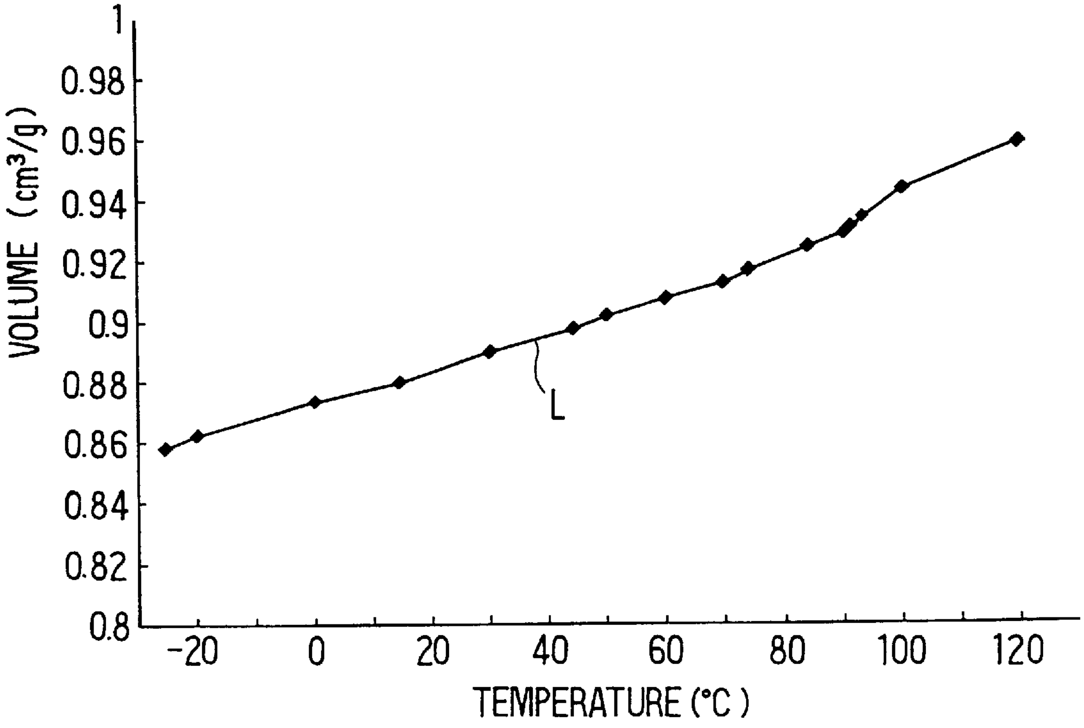
FIG. 29 is a graph plotting a relation between a volume and a temperature of a smectic liquid crystal in a conventional liquid crystal cell.

As has already been described with reference to FIGS. 27 and 28, the bubbles are linearly produced in the longitudinal direction of the barrier walls 140 at the widthwise central portion of the individual filling portions 150. As described above, moreover, these linear bubbles are thought to appear at the widthwise centers of the individual filling portions 150, because vacuums are established in the individual filling portions 150 by the volume shrinkage of the smectic liquid crystal in the individual filling portions 150 and because a force to attract the smectic liquid crystal toward the barrier walls 140 is established by the excellent wettability between the smectic liquid crystal and the barrier walls 140.

Figure 6A:
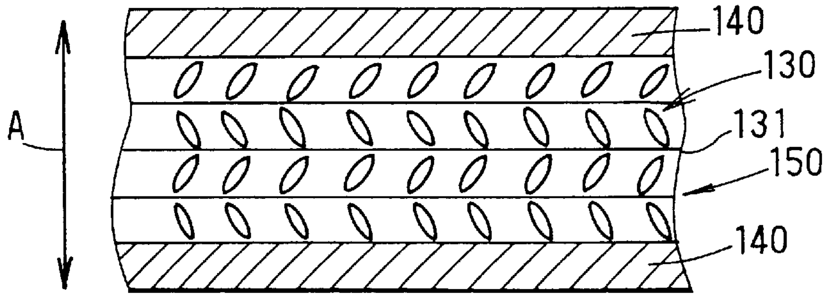
FIGS. 6A and 6B are schematic section views of portions of liquid crystal cells and show phase structures of smectic liquid crystals of the case in which an orientation film of the first embodiment is rubbed in directions of arrows A and B.

As a result, liquid crystal layers 131 of the smectic liquid crystal 130 are formed in parallel in the longitudinal direction of the barrier walls 140, as shown in FIG. 6A, when the inner surface of the orientation film 126 is rubbed in the direction (as indicated by arrow A) perpendicular to the longitudinal direction of the barrier walls 140. Furthermore, the smectic liquid crystal 130 is characterized to be easily separated by the liquid crystal layers 131 so that the linear bubbles are likely to appear when the filling portions 150 are evacuated.

Figure 6B:
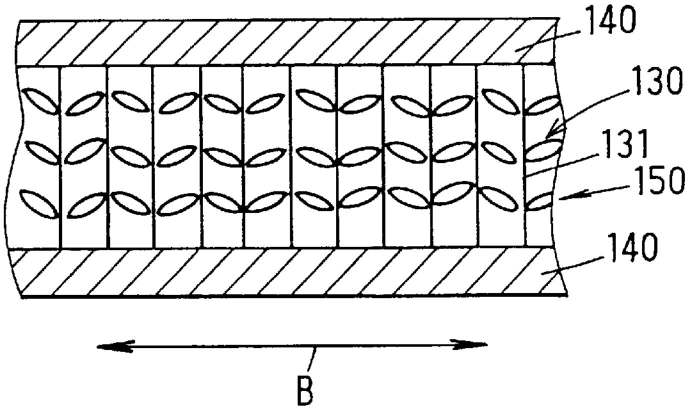

On the other hand, when the inner surface of the orientation film 126 is rubbed in a direction (as indicated by arrow B) in parallel with the longitudinal direction of the barrier walls 140, as shown in FIG. 6B, the liquid crystal layers 131 of the smectic liquid crystal 130 are formed in a direction perpendicular to the longitudinal direction of the barrier walls 140. This makes it hard to cause the separation in the liquid crystal layers 131. This means that the liquid crystal layers 131 are strong against the vacuums in the filling portions 150.

Therefore, as described above, the directions to rub the individual orientation films 114 and 126 are desired to be in parallel with the longitudinal direction of the individual barrier walls 140 and either in the same direction or in the opposite directions.

At a next seal printing step S106, the peripheral edge portion of the inner surface of the electrode substrate 110 is printed with a thermoset resin in a U-shape to form the seal 120*a*. Simultaneously with this, a liquid crystal filling port is also formed.

After this, at a superposing step S107, the two electrode substrates 110 and 120 are superposed through the seal 120*a* and the plurality of barrier walls 140. In this case, the superposition of the two electrode substrates 110 and 120 is so performed that the individual orientation directions of the two orientation films 114 and 126 may be in parallel with the longitudinal direction of the individual barrier walls 140.

Next, the treatment of a heating and pressing step S108 is taken in the following manner.

The two electrode substrates 110 and 120 thus superposed are arranged in a heating and pressing apparatus 160, as shown in FIG. 4, and the inside of this apparatus 160 is then heated by a heater.

After this, a nitrogen gas $N_2$ is pumped from a gas supply pipe 163 to the inside of an air bag 162 (made of silicone rubber) which is mounted on the inner face of an upper wall 161 of the heating and pressing apparatus 160. According to this pumping operation, the air bag 162 is inflated to press the two electrode substrates 110 and 120 uniformly on a table plate 164. At this time, the pressure is 0.9 $Kg/cm^2$, and the heating temperature is 190° C. In this state, the two electrode substrates 110 and 120 are held for 60 minutes. After this, the inside of the heating and pressing apparatus 160 is returned to the room temperature and the atmospheric pressure by a slow cooling.

According to the treatment of the heating and pressing step S108 thus far described, the height of the individual barrier walls 140 (as corresponding to the space between the two electrode substrates 110 and 120) is crushed to about 0.1 to 0.2 microns. Considering that the metal electrodes 112 have the aforementioned thickness of about 0.3 microns, the thickness of the liquid crystal layers of the smectic liquid crystal 130, i.e., the space between the two electrode substrates 110 and 120 is finally about 1.7 microns.

Here, the method of adjusting the crush of the heights of the individual barrier walls 140 is exemplified by a method of adjusting the hardness of the individual barrier walls 140 and by a method of adjusting the force to crush the individual barrier walls 140. The former is exemplified by adjusting the pre-baking temperature and time, whereas the latter is exemplified by adjusting the pressure to be applied to the two electrode substrates 110 and 120.

In the heating and pressing treatment thus far described, on the basis of the difference between the thickness of the individual color filter layers 122 and the thickness of the individual black mask layers 123, the upper faces of the individual barrier walls 140 rise, into the grooved regions between the individual two color filter layers 122 at the portions corresponding to the grooved regions, as shown in FIG. 3.

Accordingly, those portions of the back faces 142 of the individual barrier walls 140, which correspond to the aforementioned individual raised portions, are recessed according to the rises of the individual raised portions. As a result, the individual recessed portions of the back faces 142 of the individual barrier walls 140 are formed as the individual through holes 141 between the back faces 142 and the inner surface of the orientation film 114.

Therefore, for the individual barrier walls 140, the individual through holes 141 communicate between the two filling portions 150 which are located on the two sides of the corresponding barrier walls 140.

Here, the individual barrier walls 140 are crushed in their heights to about 0.1 to 0.2 microns, as described above, so that the through holes 141 have an internal diameter ranging from 0.3 to 0.9 microns.

If the flows of the smectic liquid crystal into the individual through holes 141 are turbulent or stagnant at the later-described a filling step of the smectic liquid crystal, this smectic liquid crystal is caused to have an orientation defect. Therefore, the internal diameter of the individual through holes 141 may be sized to prevent the aforementioned disturbance and stagnation of the flows.

Next, at a liquid crystal filling step S109, the two electrode substrates 110 and 120 thus heated and pressed are contained and heated in a vacuum container at about 120° C. In this state, the inside of the vacuum container is evacuated for about 2 hours to evacuate the region between the two electrode substrates 110 and 120, and a smectic liquid crystal is dripped to a portion near the liquid crystal filling port of one of the two electrode substrates 110 and 120. Accordingly, the smectic liquid crystal softens to plug the liquid crystal filling port of the seal 120*a*.

In this state, the inside of the vacuum container is returned to the atmospheric pressure, and then this atmospheric pressure is kept for 12 hours. At this state, according to the differential pressure established between the region in and the outside of the two electrode substrates 110 and 120, the smectic liquid crystal is sucked and filled into the individual filling portions 150 between the two electrode substrates 110 and 120 through the liquid crystal filling port of the seal 120*a*. Thus, the filling step of the smectic liquid crystal is ended.

After this, at a sealing step S110, the liquid crystal filling port of the seal 120*a* is plugged. As a result, the manufacture of the liquid crystal cell is ended.

Here, at the aforementioned liquid crystal filling step S109, it is difficult to completely eliminate the bubbles which are produced in the individual filling portions 150 between the two electrode substrates 110 and 120. The bubbles are left in the vicinity of the inner surface of the seal 120*a*, as indicated by letter P in FIG. 7.

Figure 11:
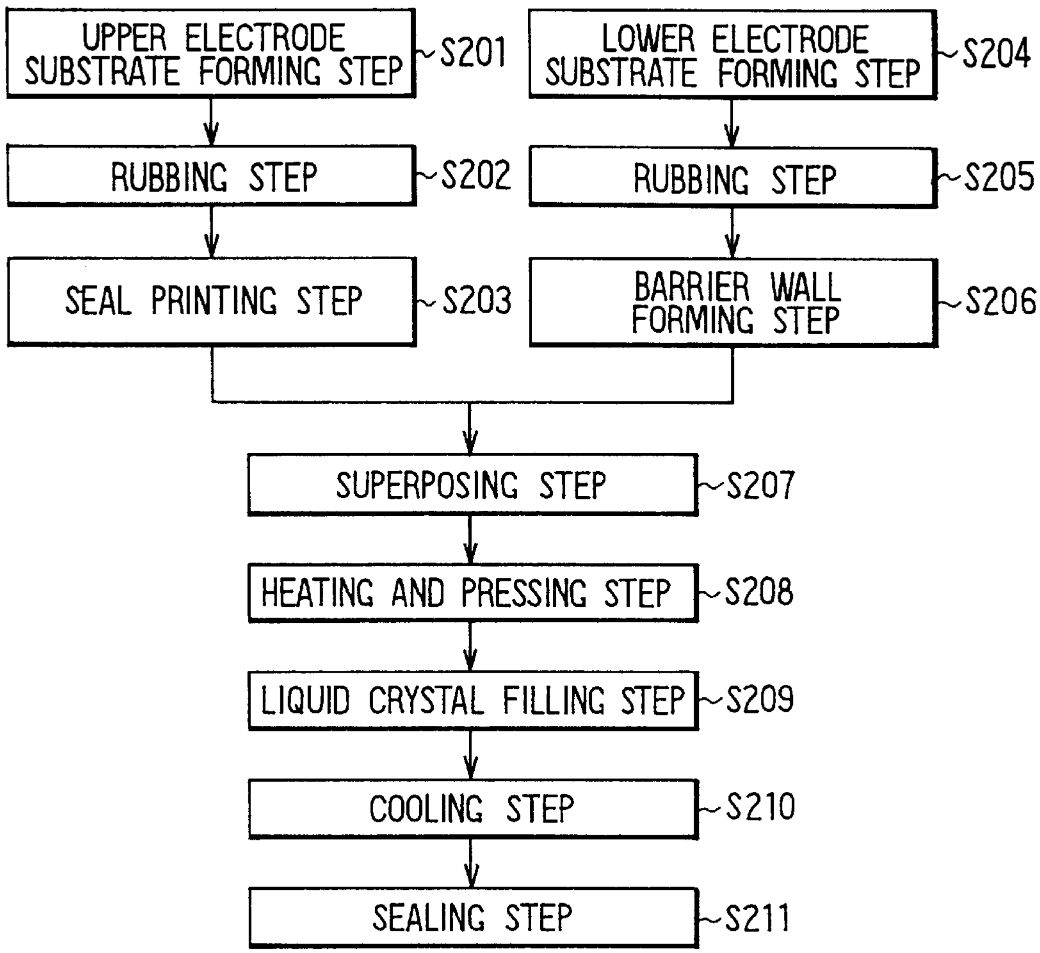
FIG. 11 is a flowchart showing a process for manufacturing the liquid crystal cell.

Here, in this embodiment, the volume change of the smectic liquid crystal filled into the individual filling portions 150, with the temperature of the smectic liquid crystal follows a graph L of FIG. 11.

The liquid crystal phase series of the smectic liquid crystal are as follows, or vice versa:

$$\text{Cry} \xrightarrow{(71.8^\circ\text{ C.})} \text{SmC}_A{}^* \xrightarrow{(73.6^\circ\text{ C.})} \text{SmC}^* \xrightarrow{(92.6^\circ\text{ C.})} \text{SmA} \rightarrow \text{ISO}$$

As a result, the smectic liquid crystal filled at 120° C. has a volume of 0.958 $cm^3/g$ in the ISO phase (i.e., isotropic phase) and shrinks by about 8% at the room temperature of 25° C. and by about 10% at −20° C.

However, even if the liquid crystal cell thus manufactured is left at a temperature as cold as −20° C. for 100 hours, the residual region of the bubbles P in the vicinity of the seal 120*a* becomes wide, but no linear bubble is produced in the display area of the liquid crystal cell. This causes no display defect in the liquid crystal cell.

The reasons for this phenomenon will be described. First of all, the aforementioned volume shrinkage occurs in the smectic liquid crystal in the individual filling portions 150 between the two electrode substrates 110 and 120, but the through holes 141 are formed between the individual barrier walls 140 and the orientation film 114, as described above.

As a result, the liquid crystal portions in the two filling portions 150 adjoining each other through the barrier walls 140 flow to and from each other through the individual through holes 141 of the barrier walls 140 to damp the vacuums which are established in the individual filling portions 150.

Secondly, when the smectic liquid crystal in the individual filling portions 150 shrinks in its volume, the volume of the bubbles P in the vicinity of the inner surface of the seal 120*a* increases with the aforementioned vacuum because the space between the two electrode substrates 110 and 120 is kept invariable by the individual barrier walls 140. This means that the volume of the bubbles P will increase by the volume shrinkage of the smectic liquid crystal to damp the vacuums because the space between the two electrode substrates 110 and 120 is invariable.

It can be concluded that the vacuums in the individual filling portions 150 are so satisfactory damped on the basis of the first and second phenomena described above that the establishment of the linear bubbles in the display area of the liquid crystal cell can be prevented in advance.

[Second Embodiment]

Figure 8:
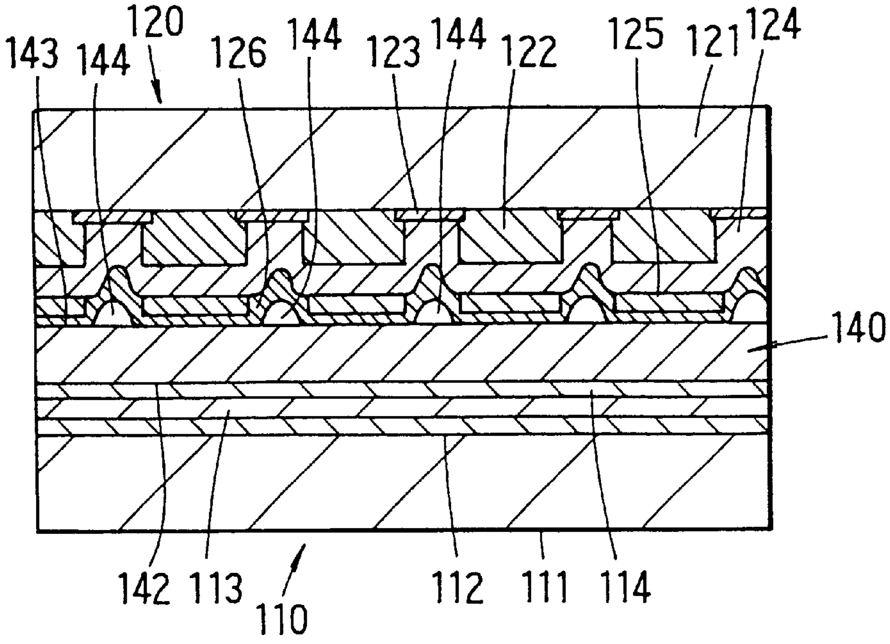
FIG. 8 is a section view showing a portion of a liquid crystal cell of a second embodiment according to the present invention.

FIG. 8 shows a second embodiment of the liquid crystal cell according to the present invention.

In this second embodiment, individual through holes 144 are formed in place of the individual through holes 141, as described in connection with the first embodiment, between the upper electrode substrate 120 and the individual barrier walls 140.

Here are formed the individual through holes 144 in the following manner.

When the upper electrode substrate 120 is formed at the upper electrode substrate forming step S102, of the first embodiment, those portions of the orientation film 126 and the over coat layer 124, which correspond to the groove-shaped regions of the two adjoining color filter layers 122, are recessed into the individual groove-shaped regions, as shown in FIG. 8.

Unlike the first embodiment, in this second embodiment, the plurality of barrier walls 140 are formed by a method similar to the aforementioned one on the inner surface of the orientation film 114 of the lower electrode substrate 110 which is formed at the lower electrode substrate forming step S101 of FIG. 4.

In this case, since the orientation film 114 of the lower electrode substrate 110 is flat, the two upper and lower end faces of the individual barrier walls 140 are generally in parallel as a whole, as shown in FIG. 8.

After this, the treatments of the two rubbing steps S104 and S105 and the seal printing step S106 of FIG. 4 are taken substantially like the first embodiment.

After these steps, at the superposing step S107 of FIG. 4, the two electrode substrates 110 and 120 are so superposed as in the first embodiment that the orientation directions of the two orientation films 114 and 126 are in parallel with the longitudinal direction of the individual barrier walls 140.

As a result, the individual through holes 144 are formed between the orientation film 126 and the surfaces 143 of the individual barrier walls 140, as shown in FIG. 8.

Next, the treatment of the heating and pressing step S108 of FIG. 4 is made.

At this heating and pressing step S108, the two electrode substrates 110 and 120 are heated and pressed, as described in connection with the first embodiment, but the two upper and lower end faces 141 and 143 of the individual barrier walls 140 are in parallel as a whole, and the orientation film 114 of the electrode substrate 110 is also flat.

Therefore, Even after the heating and pressing treatment, the orientation film 126 is kept to have the recesses, as shown in FIG. 8. As a result, the individual through holes 144 are formed between the electrode substrate 120 and the individual barrier walls 140, as shown in FIG. 8.

The individual through holes 144 thus formed communicate between the two filling portions 150 through the barrier walls 140 like the individual through holes 141 described in connection with the first embodiment.

As a result, operations and effects similar to those of the first embodiment can be achieved.

In the practice of the present invention, the liquid crystal cell may not use any color filter layer. In this modification, recesses corresponding to the through holes 141 or 144 of the first or second embodiment are formed by setting the thickness of the individual transparent electrodes of one of the two electrode substrates of the liquid crystal cell to such a value as to form those through holes.

Furthermore, upon the practice of the present invention, the liquid crystal should not be limited to the smectic liquid crystal but can adopt a liquid crystal which has a viscosity characteristic to the temperature like that of the smectic liquid crystal.

[Third Embodiment]

Figure 9:
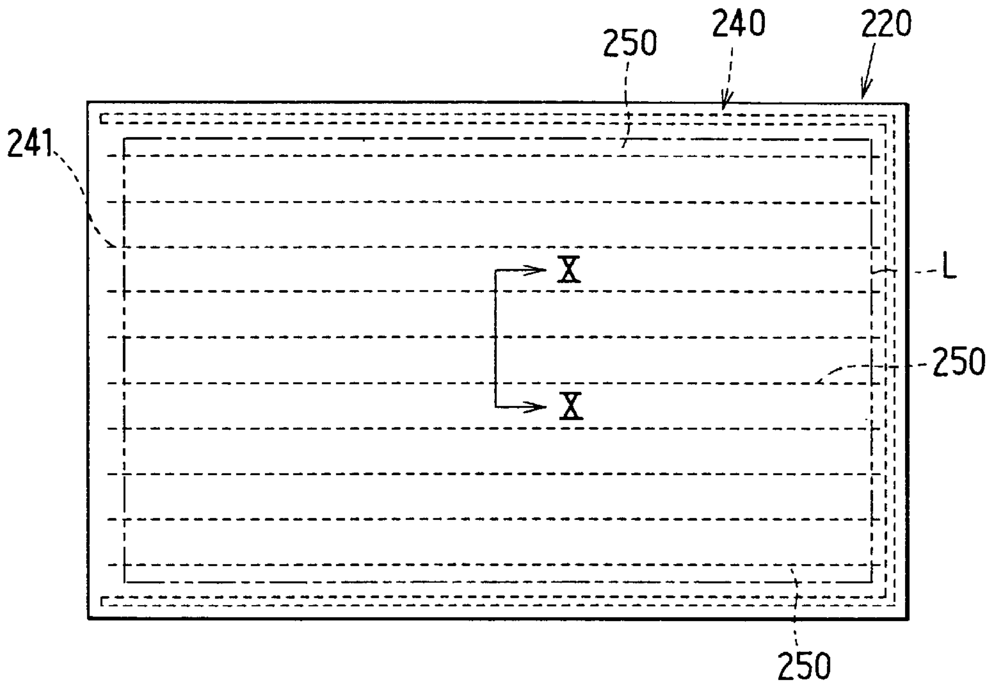
FIG. 9 is a top plan view showing a liquid crystal cell of a third embodiment according to the present invention.
Figure 10:
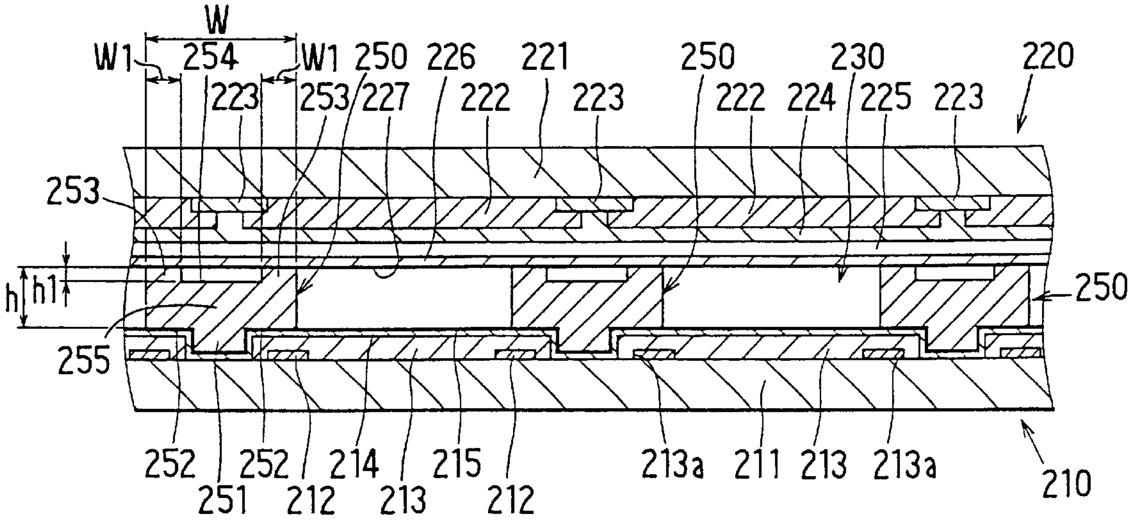
FIG. 10 is a section view of a portion taken along line X—X of FIG. 9.

FIGS. 9 and 10 show a third embodiment of the liquid crystal cell according to the present invention.

The liquid crystal cell is provided with a lower electrode substrate 210 and an upper electrode substrate 220, between which a smectic liquid crystal 230 is disposed together with a plurality of barrier walls 250 on the inner side of a band seal 240.

Here, the smectic liquid crystal 230 is exemplified by a ferroelectric liquid crystal or an anti-ferroelectric liquid crystal. The smectic liquid crystal 230 may be replaced by a liquid crystal having similar viscosity characteristics such as a liquid crystal having a high viscosity at the room temperature.

The lower electrode substrate 210 is constructed by forming a plurality of auxiliary electrodes 212, a plurality of transparent electrodes 213, a transparent insulating film 214 and a transparent orientation film 215 in this order on the inner surface of a transparent substrate 211 made of a transparent glass sheet.

Here, as shown in FIG. 10, the plurality of auxiliary electrodes 212 are buried at every their two adjoining ones, in individual recesses 213*a* which are formed in the longitudinal direction of the back face of the corresponding individual transparent electrodes 213 and on the their two widthwise side portions.

The individual auxiliary electrodes 212 are made of an opaque metal material such as aluminum (Al), titanium (Ti) to have a thickness of 4,050 angstroms to reduce the internal resistance of the corresponding individual transparent electrodes 213.

The plurality of transparent electrodes 213 are formed of a transparent electrode material such as an indium tin oxide (as will be called the "ITO") to have a thickness of 4,000 angstroms on the inner surface of the transparent substrate 211 at a predetermined space through the corresponding individual two auxiliary electrodes 212.

The insulating film 214 is formed of a transparent insulating material such as tantalum oxide ($Ta_2O_3$) to have a thickness of 1,400 angstroms on the inner surface of the transparent substrate 211 at a predetermined space through the individual transparent electrodes 213.

The orientation film 215 is formed of a transparent polyimide resin to have a thickness of 225 angstroms over the insulating film 214. Here, this orientation film 215 is rubbed by a uniaxial orientation treatment in a direction parallel to the longitudinal direction of the individual barrier walls 250.

The upper electrode substrate 220 is constructed by forming a plurality of color filter layers 222, a plurality of black mask layers 223, a passivation film 224, a plurality of transparent electrodes 225, a transparent insulating film 226, and an orientation film 227 in this order on the inner surface of a transparent substrate 221 made of a transparent glass sheet.

Here, the individual color filter layers 222 and the individual black mask layers 223 are formed alternately of each other in parallel along the inner surface of the transparent substrate 221. The individual color filter layers 222 are positioned to correspond to the individual transparent electrodes 213 in the longitudinal direction, and the individual black mask layers 223 are positioned to correspond to the regions between the individual two transparent electrodes 213 in the longitudinal direction.

Here, the individual color filter layers 222, which are located on the two sides of the individual black mask layers 223, cover the two widthwise side portions of the black mask layers 223 inbetween. The individual color filter layers 222 are formed of a transparent resin material such as an acrylic resin to have a thickness of 2 microns, and the individual black mask layers 223 are formed of a shading metal material such as chromium to have a thickness of 1,600 angstroms.

The passivation film 224 is formed of a transparent resin material such as an acrylic resin to have a thickness of 2 microns. The plurality of transparent electrodes 225 are formed of a material similar to that of the individual transparent electrodes 213 at a predetermined space on the inner surface of the passivation film 224 to have a thickness equal to that of the individual transparent electrodes 213. Here, the plurality of transparent electrodes 225 are arranged to extend at a right angle with respect to the plurality of transparent electrodes 213 to construct a plurality of matrix pixels together with the smectic liquid crystal 230.

The insulating film 226 is formed of the same material as that of the insulating film 214 to have a thickness equal to that of the insulating film 214. The orientation film 227 is made of the same material as that of the orientation film 215 to have a thickness equal to that of the orientation film 215. Here, the orientation film 227 is rubbed by a uniaxial orientation treatment in parallel with the longitudinal direction of the individual barrier walls 250.

The smectic liquid crystal 230 fills the space between the two electrode substrates 210 and 220 through a liquid crystal filling port 231 of the seal 230.

The individual barrier walls 250 are positioned in the longitudinal direction between the two electrode substrates 210 and 220, where in the regions between the individual black mask layers 223 and the two individual transparent electrodes 213 corresponding to these individual black mask layers 223. The individual barrier walls 250 are made of a photo-setting resin such as an acrylic resin as shown in FIG. 10. Here, the individual barrier walls 250 extend to the outside of a display area L (as shown in FIG. 9) of the liquid crystal cell.

Since the individual barrier walls 250 have a common sectional structure, the barrier wall 250 located on the left-hand side of FIG. 10 will be described on its sectional structure by way of example.

The barrier wall 250 is buried so that its central portion 251 in a bottom wall widthwise direction is arranged in the region between the two transparent electrodes 213 through the orientation film 215 and the insulating film 214, and its side portions 252 in the bottom wall width direction are seated on the individual opposite side portions of the two transparent electrodes 213 through the orientation film 215 and the insulating film 214. Here, the two bottom wall widthwise side portions 252 of the barrier wall 250 are opposed to the auxiliary electrodes 212 in the individual opposite side portions of the two transparent electrodes 213 through the orientation film 215 and the insulating film 214.

The barrier wall 250 is provided with two projections 253, which are bifurcated from the two widthwise side portions of the upper wall 254 of the barrier wall 250 toward the orientation film 227 of the electrode substrate 220.

As a result, the rigidity of these individual projections 253 is lower than that of the portions (as will be called the "barrier wall portions 255") of the barrier walls 250 other than the projections 253. This ground based on the following Equation (1):

$$\alpha = \frac{(w - 2w1)h1}{2w1 \cdot h - (2w1 - w)h1} \times 100\,(\%) \qquad (1)$$

In this Equation (1), letter a indicates a rigidity reducing ratio of the barrier walls 250 due to the two projections 253. The height and width of the barrier walls 250 are designated by the letters hand w, respectively, as shown in FIG. 10. The height and width of the individual projections 253 of the barrier walls 250 are designated by h1 and w1.

A process for manufacturing the liquid crystal cell thus constructed will be described with reference to FIG. 11.

The upper electrode substrate 220 of the aforementioned construction is formed at an upper electrode substrate forming step S201, and the inner surface of the orientation film 227 of the upper electrode substrate 220 is rubbed at a rubbing step S202.

After this, at a seal printing step S203, the peripheral edge portion of the inner surface of the upper electrode substrate 220 is printed with a thermoset resin in a U-shape to form the seal 240. At this time, a liquid crystal filling port 241 is also formed.

On the other hand, the lower electrode substrate 210 of the aforementioned construction is formed at a lower electrode substrate forming step S204.

Then, the inner surface of the orientation film 215 of the lower electrode substrate 210 is rubbed at a rubbing step S205.

At a barrier wall forming step S206, the plurality of barrier walls 250 are then formed on the inner surface of the lower electrode substrate 210 through the orientation film 215 in the following manner.

Specifically, a photoresist film is made of an acrylic photoresist material is formed all over the inner surface of the lower electrode substrate 210 through the orientation film 215. This photoresist film is subjected to an exposing and developing treatment with a predetermined pattern (corresponding to the plurality of barrier walls 250) by the photolithographic method to form the plurality of barrier walls 250 on the inner surface of the lower electrode substrate 210 through the orientation film 215.

In this procedure, the formation of the photoresist film is performed such that the lower electrode substrate 210 is placed to position its orientation film 215 thereover. Moreover, the aforementioned patterning treatment of the photoresist film is taken such that the individual barrier walls 250 are formed across the individual opposite side portions of the two individual transparent electrodes 213 positioned on their two sides.

Till the end of the patterning treatment, therefore, the individual barrier walls 250 drop by their own weights at their widthwise central portions into the regions between the two transparent electrodes 213 through the orientation film 215 and the insulating film 214. Accordingly, the widthwise central portions of the upper walls 254 of the barrier walls 250 also drop. As a result, the individual barrier walls 250 are formed to have a sectional structure, as shown in FIG. 10.

Here, the projections 253 have a height of h1=2,000 angstroms and a width of w1=15 microns.

When the two projections 253 of the barrier walls 250 are formed, it is important to set how high and wide the individual projections 253 are to be made. In order to lower the rigidity of the barrier walls 250, it is desired to increase the height of the individual projections 253 but decrease the width of the same. When the barrier walls 250 are formed to lie across the individual opposite side portions of the two transparent electrodes 213 on their two sides across the orientation film 215 and the insulating film 214, the projections 253 have a height of about one quarter as large as the value of the height of the barrier walls 250, from which the height of the projections 253 is eliminated, if the barrier walls 250 are made of the acrylic resin.

The width of the projections 253 is determined by the region by which the barrier walls 250 are formed to lie across the two transparent electrodes 213 on their two sides through the orientation film 215 and the insulating film 214.

Here, by setting h1=2,000 angstroms and w1=15 microns of this embodiment, the rigidity of the two projections 253 of the barrier walls 250 is lower by about 65% than that of the barrier wall portions 255 of the barrier walls 250.

At a next superposing step S207, the two electrode substrates 210 and 220 are superposed through the seal 240 and the plurality of barrier walls 250. In this case, these two electrode substrates 210 and 220 are superposed so that the individual orientation directions of the two orientation films 215 and 227 may be in parallel with the longitudinal direction of the individual barrier walls 250.

Next, the treatment of a heating and pressing step S208 is taken in the following manner.

The two electrode substrates 210 and 220 thus superposed are arranged in a heating and pressing apparatus, the inside of which is then heated by a heater.

After this, a pressure is applied between the two electrode substrates 210 and 220 by the heating and pressing apparatus. At this time, the pressure is 0.9 $Kg/cm^2$, and the heating temperature is 190° C. In this state, the two electrode substrates 210 and 220 are held for 60 minutes. After this, the inside of the heating and pressing apparatus is returned to the room temperature and the atmospheric pressure by a slow cooling.

Here will be described a treatment of a liquid crystal filling step S209.

At this liquid crystal filling step S209, the two electrode substrates 210 and 220 thus treated at the heating and pressure step S208 are contained in a vacuum container, the inside of which is evacuated for about 2 hours. As a result, the region between the two electrode substrates 210 and 220 is likewise evacuated.

Next, the two electrode substrates 210 and 220 are heated to about 120° C. In this state, a smectic liquid crystal is dripped to the portion vicinity of the liquid crystal filling port 241 of the electrode substrate 210. Accordingly, the smectic liquid crystal softens to plug the liquid crystal filling port 241 of the seal 240.

In this state, the inside of the vacuum container is returned to the atmospheric pressure, and this atmospheric pressure state is held for 12 hours. At this stage, the smectic liquid crystal is sucked and filled between the two electrode substrates 210 and 220 through the liquid crystal filling port 241 of the seal 240 in accordance with the differential pressure to be established between the region between and the outside of the two electrode substrates 210 and 220. As a result, the filling of the liquid crystal cell with the smectic liquid crystal is ended.

After this, the liquid crystal cell filled with the smectic liquid crystal is cooled to the room temperature at a cooling step S210. Here, the portion of the liquid crystal cell excepting the smectic liquid crystal is called the "cell structure".

Since the coefficient of thermal expansion of the smectic liquid crystal is considerably larger than that of the cell structure, the volume shrinkage of the smectic liquid crystal is larger than that of the cell structure at the cooling step for the liquid crystal cell.

As a result, the smectic liquid crystal shrinks to leave one of the individual orientation films of the two electrode substrates 210 and 220. Accordingly, a stress for an adhesive strength is established in the smectic liquid crystal between the smectic liquid crystal and the orientation film to be left by the former.

As described above, however, the individual barrier walls 250 have the two projections 253, which are adhered to the orientation film 227 of the electrode substrate 220. Moreover, the two individual projections 253 have a considerably smaller rigidity than that of the barrier wall portions 255 of the individual barrier walls 250, as described above.

According to the volume shrinkage difference between the cell structure and the smectic liquid crystal in the cooling procedure, the two projections 253 of the individual barrier walls 250 deform to crush in their height direction. As a result, the space between the two electrode substrates 210 and 220 becomes narrow due to the volume shrinkage of the liquid crystal layer of the smectic liquid crystal. This makes it possible to prevent such an orientation defect in advance as will be caused by the aforementioned stress in the liquid crystal layer of the smectic liquid crystal.

Here, the individual barrier walls 250 naturally have a rigidity sufficient for a spacer for keeping proper space between the two electrode substrates 210 and 220.

After this, the liquid crystal filling port 241 of the seal 240 is sealed up at a sealing step S211. Thus, the manufacture of the liquid crystal cell is ended.

Figure 12:
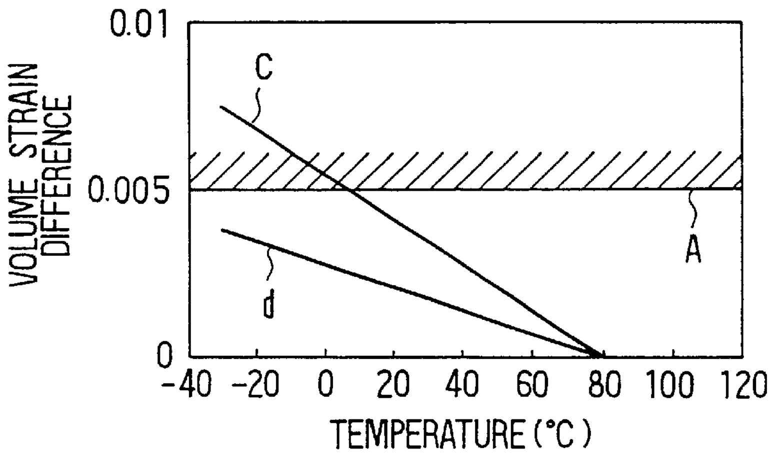
FIG. 12 is a graph plotting a relation of a volume strain difference and a temperature between a cell structure and a smectic liquid crystal in the liquid crystal cell of the third embodiment and a conventional liquid crystal cell.
Figure 23:
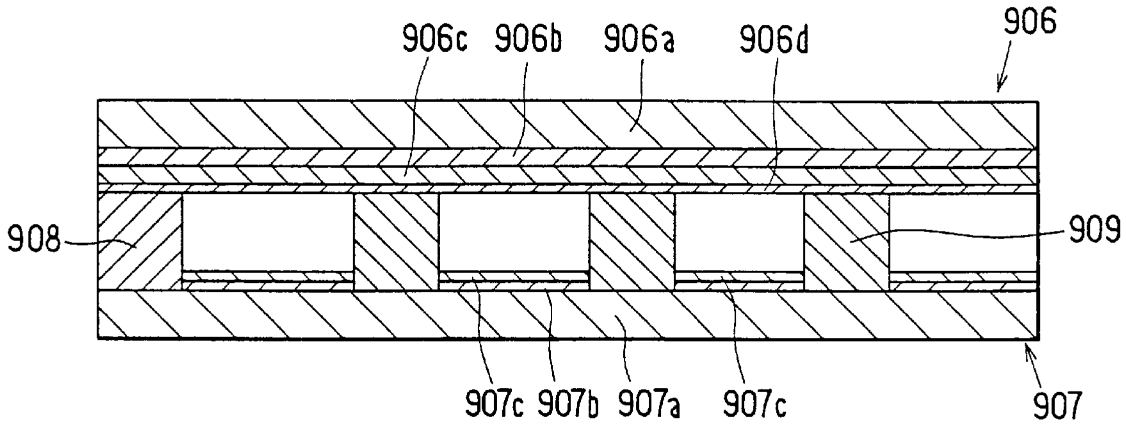
FIG. 23 is a schematic section of another conventional liquid crystal cell.
Figure 24:
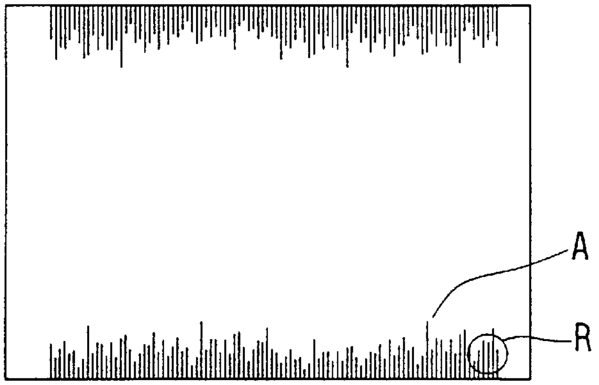
FIG. 24 is a schematic diagram showing the state in which an orientation defect of the smectic liquid crystal occurs in the liquid crystal cell of FIG. 23.
Figure 25:
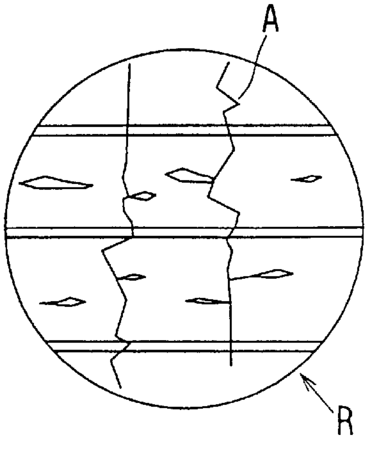
FIG. 25 is an enlarged view of a portion of the orientation defect, as circled by letter R in FIG. 24.
Figure 26:
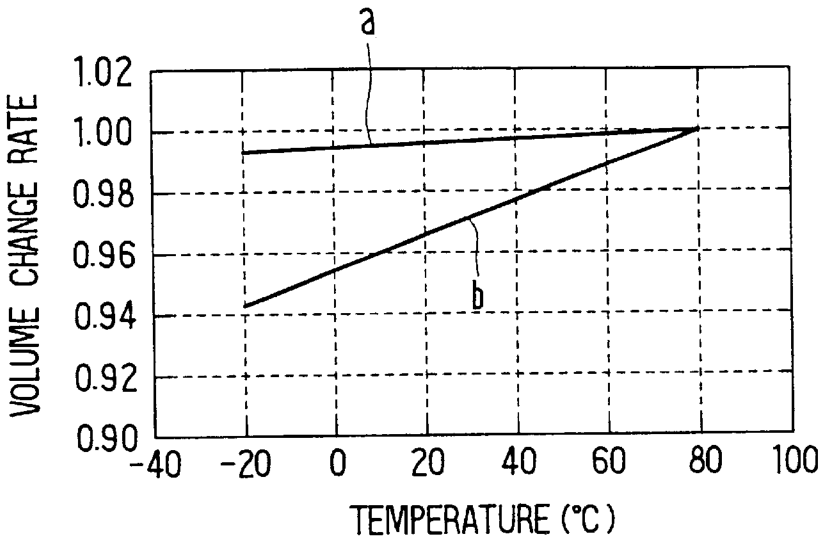
FIG. 26 is a graph plotting a relation between a volume change rate and a temperature of a cell structure of the liquid crystal cell of FIG. 23.

Here, FIG. 12 shows differences of the volume strains of the cell structure and the smectic liquid crystal between the liquid crystal cell which is equipped with the individual barrier walls 250, and the conventional liquid crystal cell in which the barrier walls do not have the two projections. Here, the condition for filling the smectic liquid crystal is based on the reference of 80° C. The conventional liquid crystal cell has been exemplified by the liquid crystal cell, as shown in FIG. 23. Here, the height and width of the barrier walls of the conventional liquid crystal cell are equalized to those of the liquid crystal cell of this embodiment, which except the two projections in the barrier walls.

In FIG. 12, a graph c illustrates the case of the conventional liquid crystal cell, and a graph d illustrates the case of the liquid crystal cell of this embodiment.

According to this figure, since the smectic liquid crystal filling condition is 80° C., as described above, the volume strain difference between the conventional liquid crystal cell and the liquid crystal cell of this embodiment at 80° C. is zero.

As the temperature lowers, however, the volume strain difference between the liquid crystal cells of the prior art and this embodiment becomes larger with increasing their discrepancy.

It is also found that the volume strain difference of the conventional liquid crystal cell exceeds an allowable limit value A as the temperature lowers, whereas the volume strain difference of the liquid crystal cell of this embodiment does not exceed even when the temperature lowers. In this case, the allowable limit value A is exemplified by the lower limit of 0.005, at which a stress for causing the orientation defect in the smectic liquid crystal is generated.

As found by comparing the two graphs of FIG. 12, the rigidity of the liquid crystal cell of this embodiment is lowered by the aforementioned sectional structure of the barrier walls. Therefore, the volume strain difference is kept at the low level even when the temperature drops. As a result, no orientation defect occurs in the smectic liquid crystal even when the temperature drops to −30° C. In the conventional liquid crystal cell, on the contrary, the orientation defect occurs at about 5° C. because of the high rigidity.

After the smectic liquid crystal of the liquid crystal cell of this embodiment is cooled, the resistance to vibrations and shocks of the liquid crystal cell are kept by the more rigid portions of the barrier walls.

[Fourth Embodiment]

Figure 13:
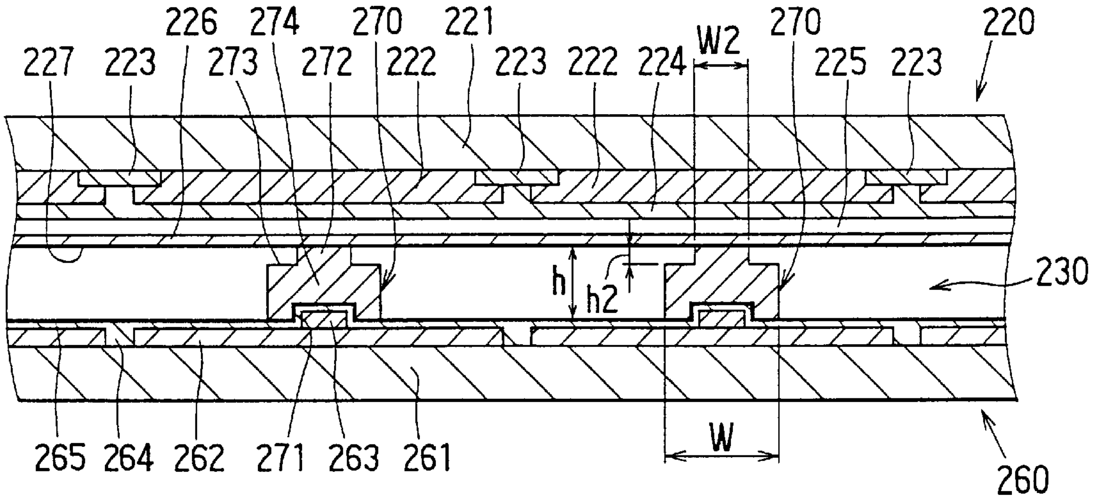
FIG. 13 is a section view showing an essential portion of a liquid crystal cell of a fourth embodiment according to the present invention.

FIG. 13 shows a fourth embodiment of the present invention.

In this fourth embodiment, a lower electrode substrate 260 and a plurality of barrier walls 270 are adopted in place of the lower electrode substrate 210 and the plurality of barrier walls 250 of the third embodiment.

The lower electrode substrate 260 is constructed by forming a plurality of transparent electrodes 262, a plurality of auxiliary electrodes 263, a transparent insulating film 264 and a transparent orientation film 265 in this order on the inner surface of a transparent substrate 261 made of a transparent glass sheet.

The plurality of transparent electrodes 262 are formed of the same material as that of the transparent electrodes of the third embodiment, at a predetermined space on the inner circumference of the transparent substrate 261 to have a thickness of 4,000 angstroms. Here, the individual transparent electrodes 262 are positioned to intersect the individual transparent electrodes 222 of the upper electrode substrate 220.

Here, the plurality of auxiliary electrodes 263 are formed at the widthwise central portions of the inner surfaces and in the longitudinal direction of the corresponding individual transparent electrodes 262. The individual auxiliary electrodes 263 are formed of a material similar to that of the auxiliary electrodes of the third embodiment, to have a thickness of 4,050 angstroms and 20 microns. These individual auxiliary electrodes 263 reduce the internal resistance of the corresponding individual transparent electrodes 262.

The insulating film 264 is formed of the same material as that of the insulating film of the third embodiment, to have a thickness of 1,400 angstroms at the widthwise central portions of the surfaces and in the longitudinal direction of the individual transparent electrodes 262.

The orientation film 265 is formed of a transparent polyimide resin to have a thickness of 225 angstroms over the insulating film 264. Here, the orientation film 265 is rubbed by a uniaxial orientation treatment in parallel with the longitudinal direction of the individual barrier walls 270.

The plurality of barrier walls 270 are positioned in the longitudinal direction in the region between the two electrode substrates 260 and 220, where between the corresponding individual transparent electrodes 263 and the color filter layers 222. The plurality of barrier walls 270 are made of a photo-setting resin such as an acrylic resin. Here, the individual barrier walls 270 extend to the outside of a display area L of the liquid crystal cell.

Since the individual barrier walls 270 have a common sectional structure, the barrier wall 270 located on the left-hand side of FIG. 13 will be described on its sectional structure by way of example.

The barrier walls 270 are seated at central portions in the widthwise at the corresponding individual transparent electrodes 262 in the longitudinal direction through the orientation film 265 and the insulating film 264 so that the corresponding individual auxiliary electrodes 263 are buried in recesses 271 formed in the widthwise central portions of their bottom walls.

The barrier walls 270 are provided with projections 272 which are formed to project with a height of 1.3 microns and a width of 20 microns from the widthwise central portions of upper walls 273 of the barrier walls 270 toward the orientation film 227 of the electrode substrate 220.

As a result, the rigidity of this projection 272 is lower than that of the portions (as will be called the "barrier wall portions 274") of the barrier walls 270 other than the projection 272. This ground is given from the following Equation (2):

$$\beta = \frac{(w - w2)h2}{w2 \cdot h - (w2 - w)h2} \times 100\,(\%) \tag{2}$$

In this Equation (2), letter β indicates a rigidity reducing ratio of the barrier walls 270 due to the projection 272. The height and width of the barrier walls 270 are designated by the letters h and w. The height and width of the projection 272 of the barrier walls 270 are designated by h2 and w2.

Figure 14:
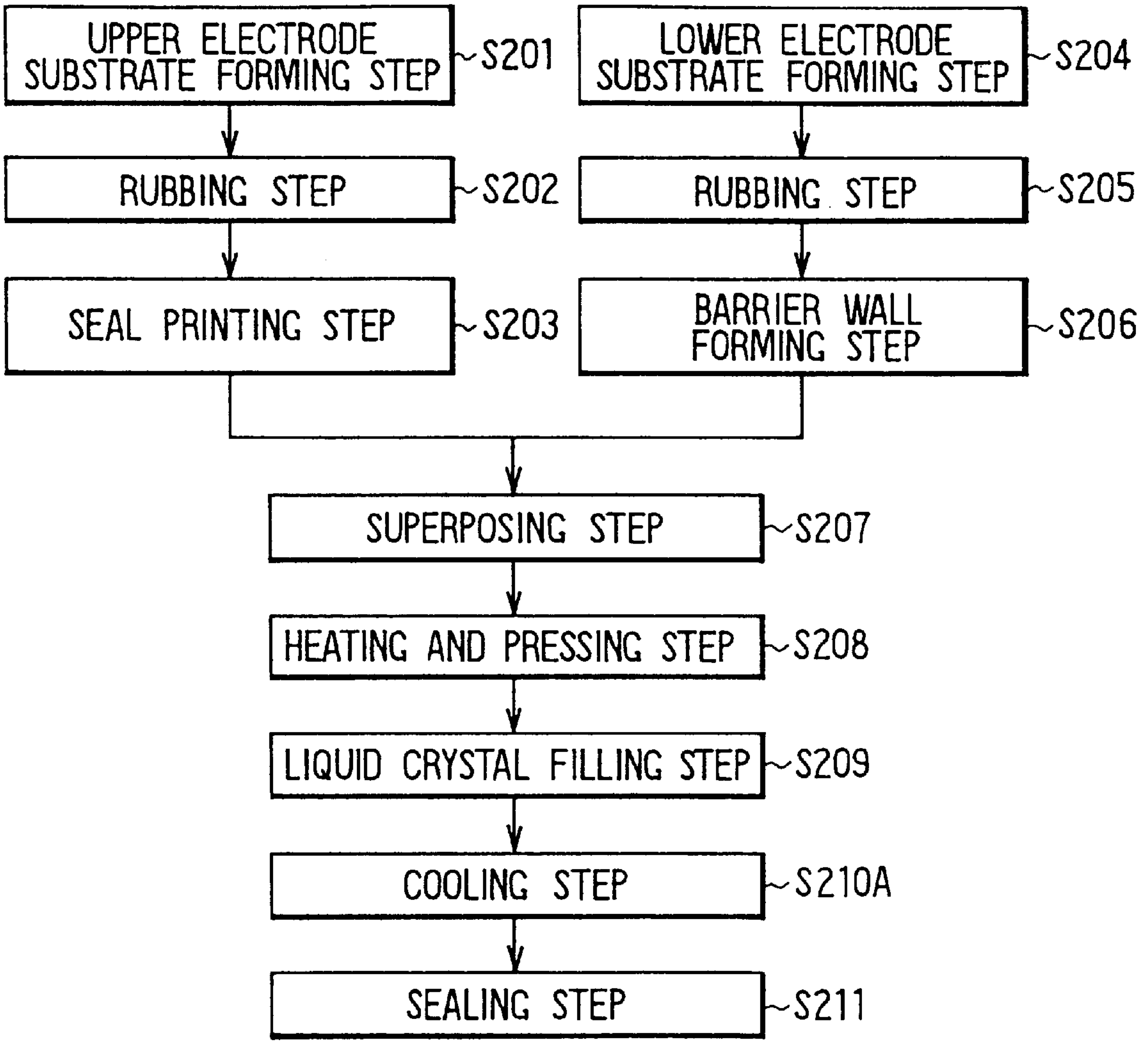
FIG. 14 is a flowchart showing a process for manufacturing the liquid crystal cell of FIG. 13.

A process for manufacturing the liquid crystal cell thus constructed will be described with reference to FIG. 14.

As described in connection with the third embodiment, the upper electrode substrate forming step S201 to the seal printing step S203, the lower electrode substrate forming step S204 and the rubbing step S205 are made. Next, the pluralities of barrier walls 270 are formed at a barrier wall forming step S206A as follows.

Specifically, an acrylic photoresist material is applied all over to the inner surface of the lower electrode substrate 260 through the orientation film 265 to form a photoresist film. Then, this photoresist film is exposed and developed to a predetermined pattern (corresponding to the plurality of barrier walls 270) by the photolithographic method to form the plurality of barrier walls 270 on the inner surface of the lower electrode substrate 260 through the orientation film 265.

In this procedure, the photoresist film is formed with the lower electrode substrate 260 being positioned under the orientation film 265. Moreover, this patterning treatment of the photoresist film is taken such that the individual barrier walls 270 correspond at their widthwise central portion to those of the corresponding individual auxiliary electrodes 263 and accordingly the corresponding individual transparent electrodes 262 through the orientation film 265 and the insulating film 264.

By the end of the patterning treatment, therefore, each barrier wall 270 drops at its two widthwise side portions onto the transparent electrodes 262 by its own weight. In the widthwise central portion of the bottom wall of each barrier wall 270, there is accordingly formed each recess 271, in which the corresponding auxiliary electrode 263 is buried, and the widthwise central portion of the upper wall 273 of the barrier wall 270 projected upward to form each projection 272. As a result, each barrier wall 270 is formed to have a sectional structure, as shown in FIG. 13.

Here, the projection 272 has a height of h2=1,000 angstroms and a width of w2=20 microns.

When the projection 272 of the barrier wall 270 is to be formed, it is important, as in the projections 253 of the barrier walls 250 described in connection with the third embodiment, how high and wide the projection 272 is set. In order to lower the rigidity of the barrier wall 270, it is desired to increase the height of the projection 272 but to decrease the width of the projection 272. When the barrier wall 270 is formed as in this embodiment to lie across the auxiliary electrode 263 positioned at the widthwise center of its bottom wall through the orientation film 265 and the insulating film 264, the height of the projection 272 is about one quarter of the height of the barrier wall 270 excepting that of the projection 272, if the barrier wall 270 is made of an acrylic resin.

Here in this embodiment, the rigidity of the projection 272 of the barrier wall 270 is made lower by about 43% than that of the barrier wall portion 274 of the barrier wall 270 by setting h2=1,000 angstroms and w2=20 microns, as described above.

When the seal printing step S203 and the barrier wall forming step S206A are ended, the upper electrode substrate 220 is superposed on the lower electrode substrate 260 in place of the lower electrode substrate 210 at the next superposing step S207 substantially the same as in the third embodiment.

After the heating and pressing step S208 and the liquid crystal filling step S209 are taken substantially as in the third embodiment, at a cooling step S210A, a cooling treatment similar to that of the cooling step S210 of the third embodiment is taken.

As the liquid crystal cell is cooled down, as in the third embodiment, the smectic liquid crystal shrinks away from one of the individual orientation films of the two electrode substrates 210 and 260, and then a stress is established in the smectic liquid crystal by the action of its adhesion between the smectic liquid crystal and the orientation film, which is left by the liquid crystal.

As described above, however, the projections 262 adhered to the orientation film 227 of the electrode substrate 220 are individually formed on the individual barrier walls 270. Moreover, the individual projections 272 have a considerably smaller rigidity than that of the barrier wall portions 274 of the individual barrier walls 270.

As a result, the projections 272 of the individual barrier walls 270 are deformed to crush in their height direction in accordance with the volume shrinkage difference between the cell structure and the smectic liquid crystal in the cooling procedure substantially as in the case described in connection with the third embodiment.

Thus, the space between the two electrode substrates 220 and 260 grows narrower according to the volume shrinkage of the liquid crystal layer of the smectic liquid crystal. As a result, it is possible to prevent in advance the occurrence of the orientation defect which will be caused by the aforementioned stress in the liquid crystal layer of the smectic liquid crystal. The remaining operations and effects are similar to those of the third embodiment.

[Fifth Embodiment]

Figure 15:
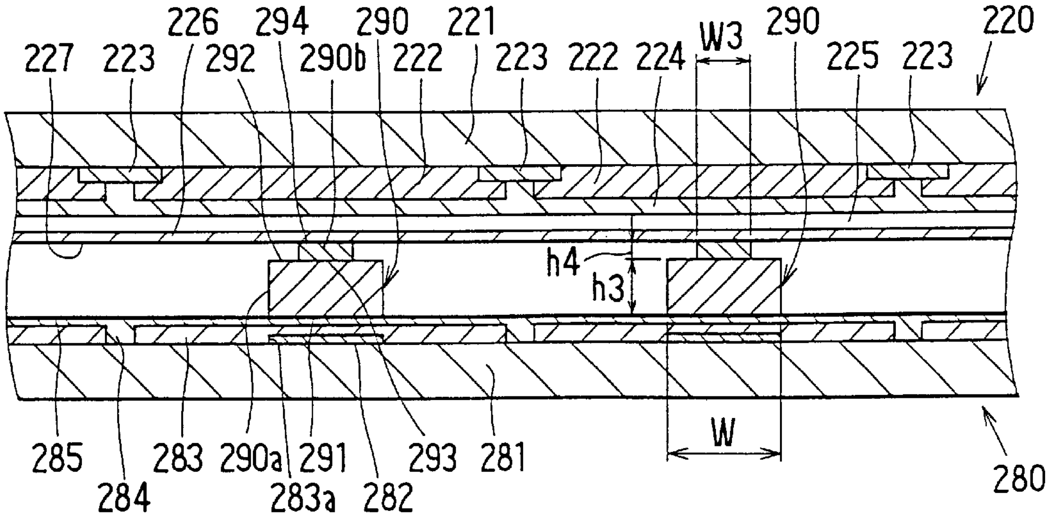
FIG. 15 is a section showing an essential portion of a liquid crystal cell of a fifth embodiment according to the present invention.

FIG. 15 shows a fifth embodiment of the present invention.

In this fifth embodiment, a lower electrode substrate 280 and a plurality of barrier walls 290 are adopted in place of the lower electrode substrate 210 and the plurality of barrier walls 250 of the third embodiment.

The lower electrode substrate 280 is constructed by forming a plurality of auxiliary electrodes 282, a plurality of transparent electrodes 283, a transparent insulating film 284 and a transparent orientation film 285 in this order on the inner surface of a transparent substrate 281 made of a transparent glass sheet.

The plurality of transparent electrodes 283 are formed of the same material as that of the transparent electrodes of the third embodiment at a predetermined space on the inner surface of the transparent substrate 281 to have a thickness of 4,000 angstroms. Here, the individual transparent electrodes 283 are positioned to intersect the individual transparent electrodes 222 of the upper electrode substrate 220.

Here, the plurality of auxiliary electrodes 282 are individually buried in recesses 283*a* which are formed in the longitudinal direction of the back faces and at the widthwise centers of the corresponding individual transparent electrodes 283. The individual auxiliary electrodes 282 are formed of a material similar to that of the auxiliary electrodes of the third embodiment to have a thickness of 4,050 angstroms, and lower the internal resistance of the corresponding each transparent electrode 283.

The insulating film 284 is formed of the same material as that forming the insulating film of the third embodiment, on the inner surface of the transparent substrate 281 via the individual transparent electrodes 283 to have a thickness of 1,400 angstroms.

The orientation film 285 is formed of a material similar to that of the orientation film of the third embodiment to have a thickness of 225 angstroms.

Each barrier wall 290 is positioned in its longitudinal direction to extend between the two electrode substrates 280 and 220 and along the corresponding color filter layers 222 and transparent electrodes 283, and is formed of a barrier wall portion 290*a* and a barrier wall portion 290*b*. Here in each barrier wall 290, both the barrier wall portion 290*a* and the barrier wall portion 290*b* are made of a photo-setting resin such as an acrylic resin.

Since the individual barrier walls 290 have a common sectional structure, the barrier wall 290 located on the left-hand side of FIG. 15 will be described on its sectional structure by way of example.

The barrier walls 290 are seated at the bottom walls 291 of their barrier wall portions 290*a* on the orientation film 285 so as to correspond to the auxiliary electrodes 282. On the other hand, the barrier wall portions 290*b* are seated at their bottom walls 293 on the widthwise central portions and in the longitudinal direction of the upper walls 292 of the barrier wall portions 290*a*, and are adhered at their upper walls 294 to the orientation film 227 so as to extend along and correspond to the widthwise central portions of the color filter 222. Here, the barrier wall portions 290*b* have a height of 1.3 microns and a width of 46 microns.

As a result, the rigidity of the barrier wall portions 290*b* is lower than that of the barrier wall portions 290*a*. This ground is given from the following Equation (3):

$$\gamma = \frac{(w - w3)h4}{w3 \cdot h3 + w \cdot h4} \times 100\,(\%) \tag{3}$$

In this Equation (3), letters h3 indicate the height of the barrier wall portions 290*a*, and letters h4 indicate the height of the barrier wall portions 290*b*. Letters w3 indicate the width of the barrier wall portions 290*b*.

Figure 16:
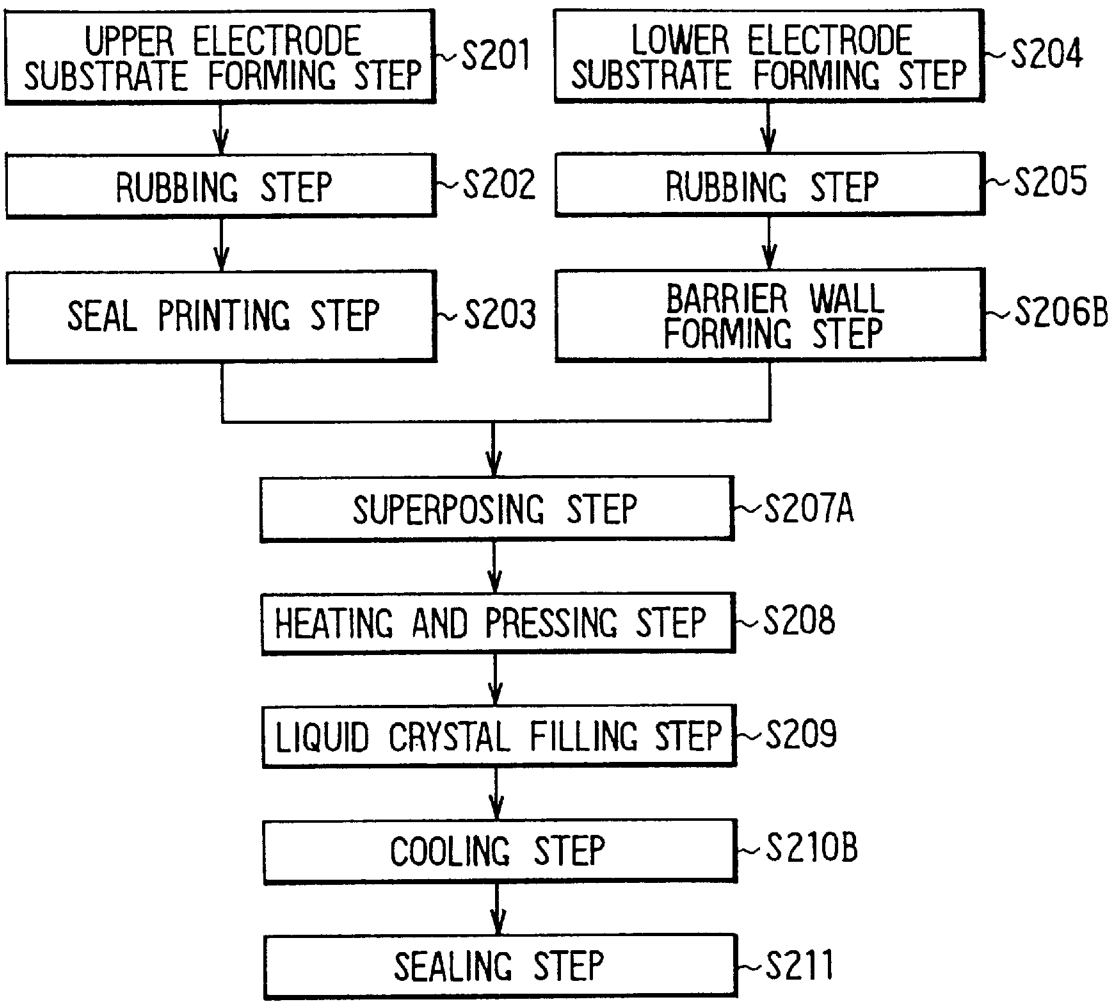
FIG. 16 is a flowchart showing a process for manufacturing the liquid crystal cell of FIG. 15.

A process for manufacturing the liquid crystal cell thus constructed will be described with reference to FIG. 16.

There are taken the upper electrode substrate forming step S201 to the seal printing step S203, the lower electrode substrate forming step S204 and the rubbing step S205 which are similar to those of the foregoing third embodiment. Next, the plurality of barrier walls 290 are formed at a barrier wall forming step S206B in the following manner.

At the barrier wall forming step S206B, more specifically, a acrylic photoresist material is applied all over to the inner surface of the upper electrode substrate 220 through the orientation film 227 to form a photoresist film. This photoresist film is subjected to an exposing and developing treatment to a predetermined pattern (corresponding to the plurality of barrier wall portions 290*b*) by the photolithographic method to form the plurality of barrier wall portions 290*b* on the inner surface of the upper electrode substrate 220.

A photoresist film is also formed of an acrylic photoresist material on the inner surface of the lower electrode substrate 280 through the orientation film 285. This photoresist film is subjected to an exposing and developing treatment to a predetermined pattern (corresponding to the plurality of barrier wall portions 290*a*) by the photolithographic method to form the plurality of barrier wall portions 290*b* on the inner surface of the lower electrode substrate 280 through the orientation film 285.

After this barrier wall forming step S206B, the two electrode substrates 220 and 280 are superposed at a next superposing step S207A in the following manner.

Specifically, the barrier wall portions 290*b* are seated at their bottom walls 293 on the widthwise central portions of the upper walls 292 of the corresponding barrier wall portions 290*a* to form the barrier walls 290, the seal 240 is located on the outer peripheral portion between the two electrode substrates 220 and 280 and the two electrode substrates 280 and 220 are so superposed that the individual orientation directions of the two orientation films 285 and 227 may be in parallel with the longitudinal direction of the individual barrier walls 290.

As a result, the individual barrier walls 290 are formed to have a sectional structure, as shown in FIG. 15.

Here, the barrier wall portions 290*a* have a height of h3=1,000 angstroms and a width of w=46 microns. The barrier wall portions 290*b* have a height of h4=3,000 angstroms and a width of w3=20 microns. In this embodiment, the individual barrier walls 290 can lower the rigidity by about 23%.

When the barrier wall portions 290*b* are to be formed, it is important as in the case of the projections 253 of the barrier walls 250 of the third embodiment how high and wide the barrier wall portions 290*b* are to be set. In order to lower the rigidity of the barrier walls 290, it is desired to increase the height of the barrier wall portions 290*b* sufficiently but to decrease the width of the barrier wall portions 290*b*.

In this embodiment, the barrier wall portions 290*a* are formed on the inner surface of the lower electrode substrate 280, whereas the barrier wall portions 290*b* are formed on the inner surface of the upper electrode substrate 220. When the barrier walls 290 are to be formed, therefore, the rigidity of the barrier wall portions 290*b* can be made smaller by about 43% than that of the barrier wall portions 290*a*.

Next, the heating and pressing step S208 and the liquid crystal filling step S209 like those of the third embodiment are taken. At a next cooling step S210B, a cooling treatment similar to the cooling step S210 of the third embodiment is taken.

At this cooling step, a stress is established by the action of the adhesion in the smectic liquid crystal between this liquid crystal and the orientation film to be left by the same.

As described above, however, the individual barrier walls 290 have barrier wall portions 290B formed on the barrier wall portions 290*a* for functioning as the projections, and their barrier wall portions 290*b* are adhered to the orientation film 227 of the electrode substrate 220. Moreover, the individual barrier wall portions 240*b* have a considerably smaller rigidity than that of the individual barrier wall portions 240*a*, as mentioned above.

As a result, the individual barrier wall portions 290*b* are deformed to crush in their height direction according to the volume shrinkage difference in the cooling procedure between the cell structure and the smectic liquid crystal.

Thus, the space between the two electrode substrates 220 and 280 becomes narrower according to the volume shrinkage of the liquid crystal layer of the smectic liquid crystal. As a result, it is possible to prevent in advance the occurrence of the orientation defect which will be caused in the liquid crystal layer of the smectic liquid crystal by the aforementioned stress. The remaining operations and effects are similar to those of the third embodiment.

Figure 17:
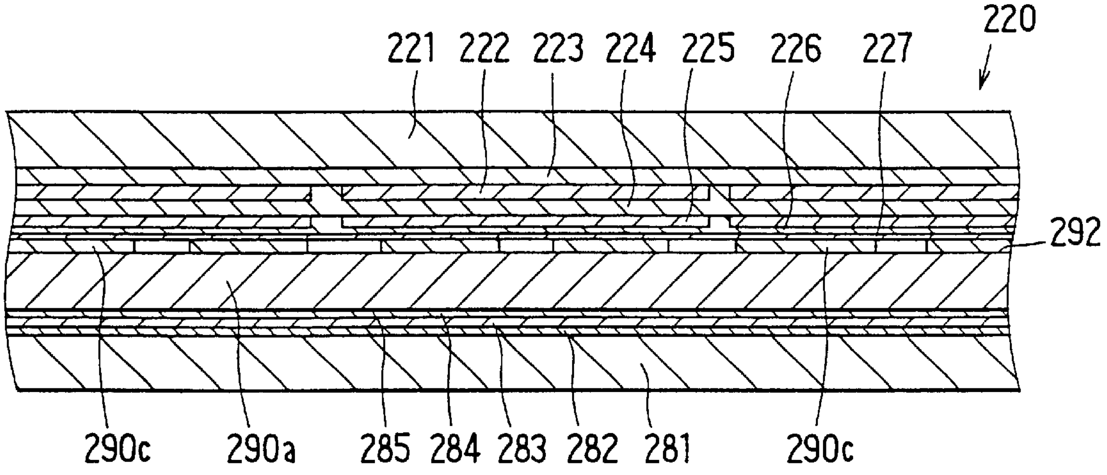
FIG. 17 is a section view showing an essential portion of a modification of the fifth embodiment.

FIG. 17 shows a modification of the fifth embodiment.

In this modification, the individual barrier walls 290 of the fifth embodiment are provided with a plurality of barrier wall portions 290c in place of the barrier wall portions 290*b*, as shown in FIG. 17. The plurality of these barrier wall portions 290*c* are formed at each barrier wall 290 and for every two pixels at a space along and at the widthwise central portions of the upper walls 292 of the barrier wall portions 290*a*. Here, the width of the individual barrier wall portions 290*c* is equal to that of the individual barrier wall portions 290*b* of the fifth embodiment.

For each barrier wall 290, on the other hand, the plurality of barrier wall portions 290*c* are formed in place of the barrier wall portions 290*b* over the orientation film 227 of the electrode substrate 220. The remaining steps of manufacturing the liquid crystal cell are substantially similar to those of the fifth embodiment.

Here, the individual barrier wall portions 290*c* are formed at the space so that they are less rigid than the barrier wall portions 290*b* for each barrier wall 290. As a result, at the cooling step S210B, the deformation of the individual barrier wall portions 290*c* follows the volume shrinkage of the liquid crystal layer of the smectic liquid crystal more smoothly than the barrier wall portions 290*b*.

As a result, it is more reliably possible to prevent the occurrence of the orientation defect, which will occur in the liquid crystal layer of the smectic liquid crystal. The remaining operations and effects are similar to those of the fifth embodiment.

[Sixth Embodiment]

A sixth embodiment of the present invention will be described with reference to the accompanying drawings.

Figure 18:
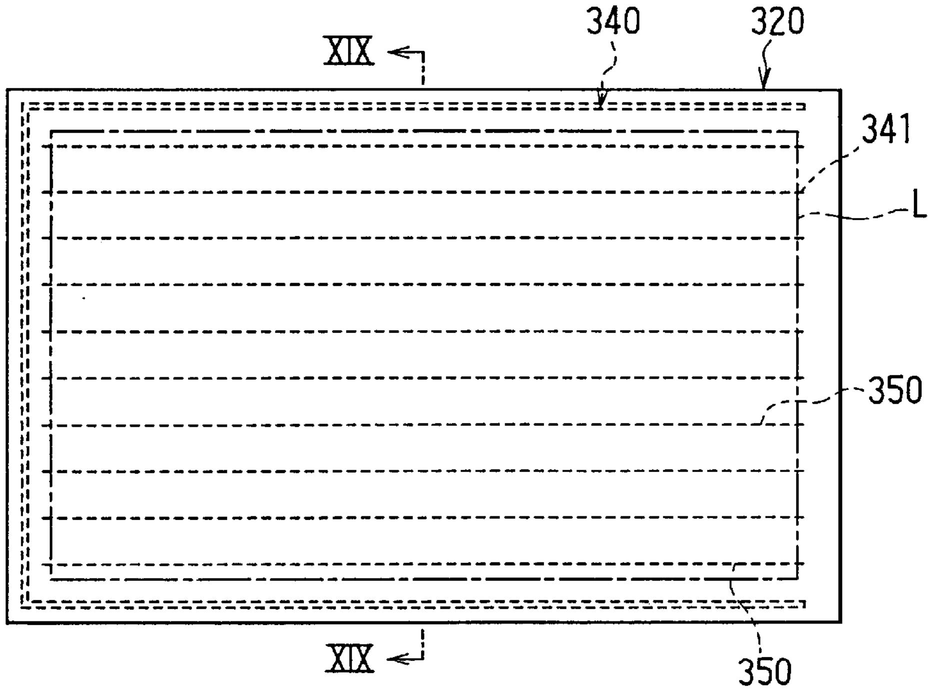
FIG. 18 is a top plan view showing the liquid crystal cell of a sixth embodiment according to the present invention.
Figure 19:
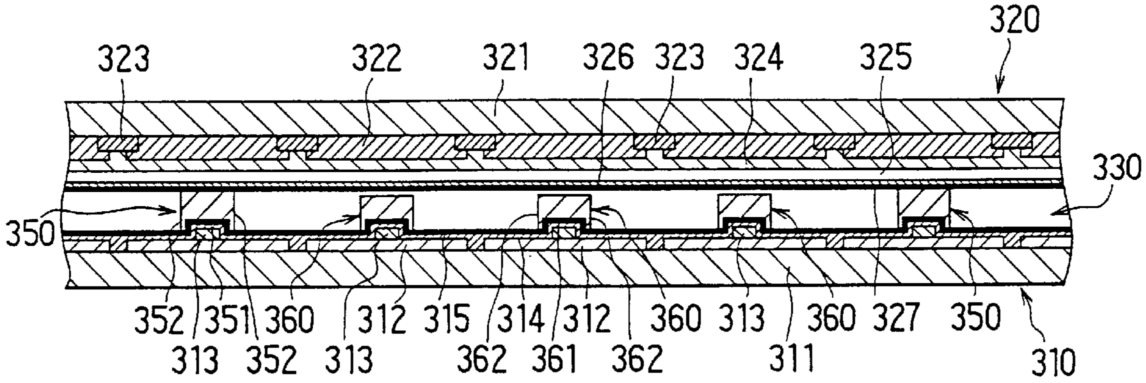
FIG. 19 is a section view of a portion taken along line XIX—XIX of FIG. 18.

FIGS. 18 and 19 show an example of the liquid crystal cell according to this embodiment.

This liquid crystal cell is constructed to include a lower electrode substrate 310 and an upper electrode substrate 320, between which a smectic liquid crystal 330 is interposed together with a plurality of adhered barrier walls 350 and a plurality of unadhered barrier walls 360 on the inner peripheral side of a band seal 340.

The smectic liquid crystal 330 is exemplified by a ferroelectric liquid crystal or an anti-ferroelectric liquid crystal. The smectic liquid crystal 330 may be replaced by a liquid crystal having similar viscosity characteristics such as a liquid crystal having a high viscosity at the room temperature.

The lower electrode substrate 310 is constructed by forming a plurality of transparent electrodes 312, a plurality of auxiliary electrodes 313, a transparent insulating film 314 and a transparent orientation film 315 in this order on the inner surface of a transparent substrate 311 made of a transparent glass sheet.

Here, the plurality of transparent electrodes 312 are formed of a transparent electrode material such as an indium tin oxide (as will be called the "ITO") to have a thickness of 4,000 angstroms at a predetermined interval on the inner surface of the transparent substrate 311. The plurality of auxiliary electrodes 313 are formed on the surface and in the longitudinal direction of the corresponding transparent electrodes 312, as shown in FIG. 19.

The individual auxiliary electrodes 313 are made of an opaque metal material such as aluminum (Al) or titanium (Ti) to have a thickness of 4,050 angstroms so that they reduce the internal resistance of the corresponding individual transparent electrodes 312.

The insulating film 314 is formed of a transparent insulating material such as tantalum oxide ($Ta_2O_3$) to have a thickness of 1,400 angstroms on the inner surface of the transparent substrate 311 through the individual auxiliary electrodes 313 and the individual transparent electrodes 312.

The orientation film 315 is formed of a transparent polyimide resin to have a thickness of 225 angstroms over the insulating film 314. Here, this orientation film 315 is rubbed by a uniaxial orientation treatment in a direction parallel to the longitudinal direction of the individual adhered barrier walls 350.

The upper electrode substrate 320 is constructed by forming a plurality of color filter layers 322, a plurality of black mask layers 323, a passivation film 324, a plurality of transparent electrodes 325, a transparent insulating film 326, and an orientation film 327 in this order on the inner surface of a transparent substrate 321 made of a transparent glass sheet.

Here, the individual color filter layers 322 and the individual black mask layers 323 are formed alternately of each other in parallel along the inner surface of the transparent substrate 321. The individual color filter layers 322 are positioned to correspond to the individual transparent electrodes 312 in the longitudinal direction, and the individual black mask layers 323 are positioned to correspond to the regions between the individual two transparent electrodes 312 in the longitudinal direction.

Here, the individual color filter layers 322 which are located on the two sides of the individual black mask layers 323, cover the two widthwise side portions of the black mask layers 323 inbetween. On the other hand, the individual color filter layers 322 are formed of a transparent resin material such as an acrylic resin to have a thickness of 2 microns, and the individual black mask layers 323 are formed of a shading metal material such as chromium to have a thickness of 1,600 angstroms.

The passivation film 324 is formed of a transparent resin material such as an acrylic resin to have a thickness of 2 microns. The plurality of transparent electrodes 325 are formed of a material similar to that of the individual transparent electrodes 312 at a predetermined space on the inner surface of the passivation film 324 to have a thickness equal to that of the individual transparent electrodes 312. Here, the plurality of transparent electrodes 325 are arranged to extend at a right angle with respect to the plurality of transparent electrodes 312 to construct a plurality of matrix pixels together with the smectic liquid crystal 330.

The insulating film 326 is formed of the same material as that of the insulating film 314 to have a thickness equal to that of the insulating film 314. The orientation film 327 is made of the same material as that of the orientation film 315 to have a thickness equal to that of the orientation film 315. Here, the orientation film 327 is rubbed by a uniaxial orientation treatment in parallel with the longitudinal direction of the individual adhered barrier walls 350.

The smectic liquid crystal 330 fills the space between the two electrode substrates 310 and 320 through a liquid crystal filling port 341 of the seal 340.

The individual adhered barrier walls 350 are positioned in the longitudinal direction between the two electrode substrates 310 and 320, where between the widthwise centers of the individual color filter layers 322 and the widthwise centers of the individual transparent electrodes 312 corresponding to these individual color filter layers 322. The individual adhered barrier walls 350 are made of a photo-setting resin such as an acrylic resin. Here, the individual adhered barrier walls 350 extend to the outside of a display area L (as shown in FIG. 18) of the liquid crystal cell.

Since the individual adhered barrier walls 350 have a common sectional structure, the adhered barrier wall 350 located on the left-hand side of FIG. 19 will be described on its sectional structure by way of example.

The adhered barrier walls 350 are seated at grooves 351, which are formed at the widthwise central portions of their bottom walls, on the widthwise centers of the transparent electrodes 312 through the orientation film 315, the insulating film 314 and the corresponding auxiliary electrodes 313. The adhered barrier walls 350 are seated at two widthwise side portions of their bottom walls 352 on the widthwise central portions of the transparent electrodes 312 on the two sides of the corresponding auxiliary electrodes 313 through the orientation film 315 and the insulating film 314.

Here, these adhered barrier walls 350 are enabled to suppress the orientation disturbance of the smectic liquid crystal by keeping constant the space between the two electrode substrates 310 and 320, by suppressing the vibrations which are excited by the drive signal at the time of driving the liquid crystal cell, and by giving the resistance to the shocks and vibrations at the time of using the liquid crystal cell.

The plurality of unadhered barrier walls 360 are arranged in three equidistant ridges in parallel with and between the adjoining two individual adhered barrier walls 350. Here, the individual unadhered barrier walls 360 are given a sectional shape similar to that of the bottom walls of the individual adhered barrier walls 350 and are seated at grooves 361, which are formed at the widthwise central portions of their bottom walls, on the widthwise centers of the transparent electrodes 312 through the orientation film 315, the insulating film 314 and the corresponding auxiliary electrodes 313. The two widthwise side portions 362 of the bottom walls of the unadhered barrier walls 360 are seated on the widthwise central portions of the transparent electrodes 312 on the two sides of the corresponding auxiliary electrodes 313 through the orientation film 315 and the insulating film 314.

Figure 20:
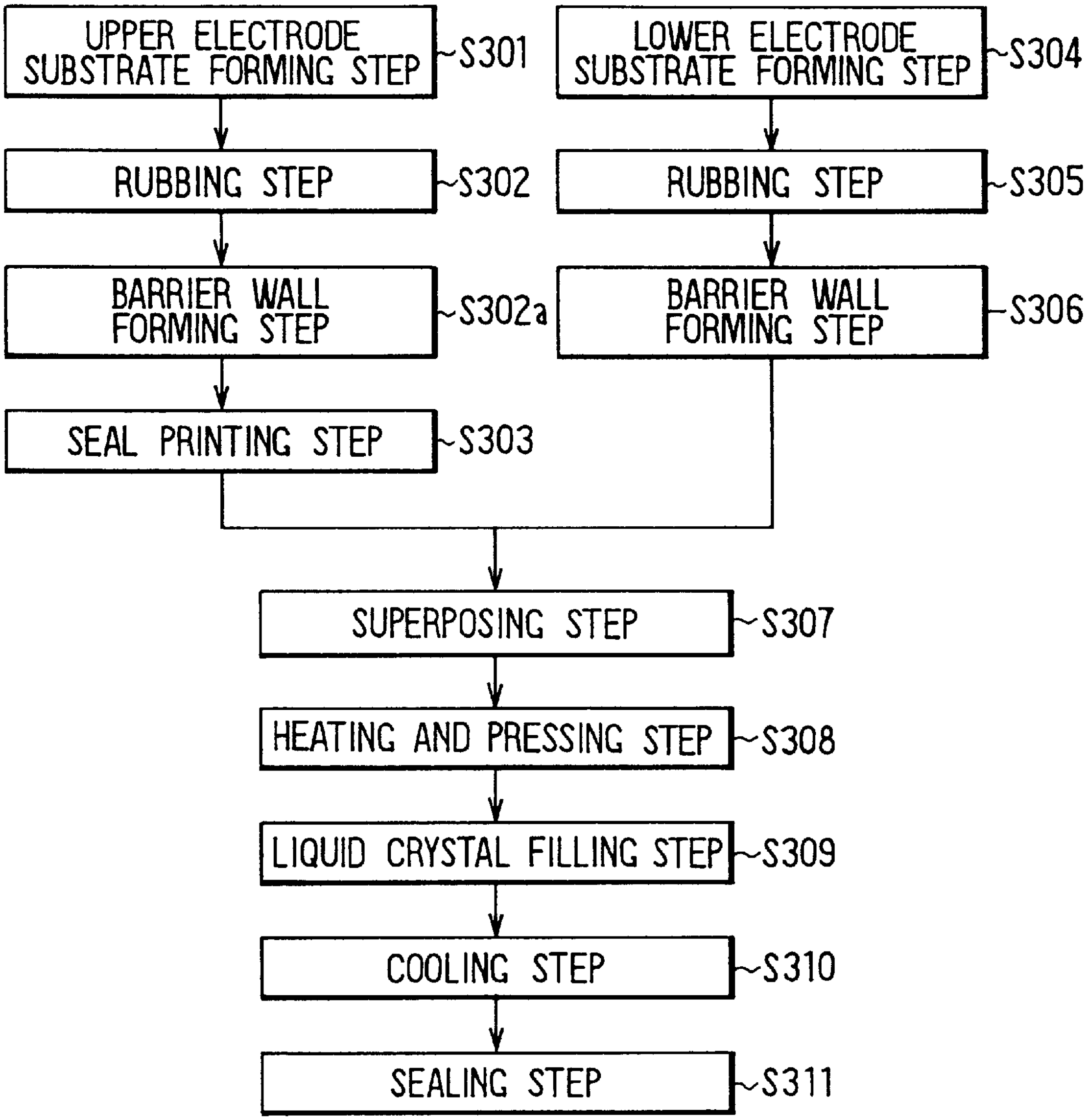
FIG. 20 is a flowchart showing a process for manufacturing the liquid crystal cell.

Next, a process for manufacturing the liquid crystal cell thus constructed will be described with reference to FIG. 20.

The upper electrode substrate 320 having the aforementioned construction is formed at an upper electrode substrate forming step S301, and the inner circumference of its orientation film 327 is rubbed at a rubbing step S302.

After this, at a barrier wall forming step S302*a*, the plurality of adhered barrier walls 350 are formed over the orientation film 327 of the upper electrode substrate 320 in the following manner.

Specifically, a photoresist material such as an acrylic photo-setting resin is applied all over to the inner surface of the upper electrode substrate 320 to form a photoresist film through the orientation film 327. This photoresist film is subjected to an exposing and developing treatment to a predetermined pattern (corresponding to the plurality of adhered barrier walls 350) by the photolithographic method to form the plurality of adhered barrier walls 350 on the inner surface of the upper electrode substrate 320 through the orientation film 327. Here, the individual adhered barrier walls 350 have a height of 1.3 microns and a width of 46 microns.

Next, at a seal printing step S303, the peripheral edge portion of the inner surface of the upper electrode substrate 320 is printed with a thermoset resin in a U-shape to form the seal 340. At this time, the liquid crystal filling port 341 is also formed.

The lower electrode substrate 310 constructed the above is formed at a lower electrode substrate forming step S304.

At a rubbing step S305, the inner surface of the orientation film 315 of the lower electrode substrate 310 is rubbed.

Next, the plurality of unadhered barrier walls 360 are formed over the orientation film 315 of the lower electrode substrate 310 at a barrier wall forming step S306 as follows.

The same material as that forming the adhered barrier walls 350 is applied all over to the inner surface of the lower electrode substrate 310 via the orientation film 315 to form a photoresist film. This photoresist film is subjected to an exposing and developing treatment to a predetermined pattern (corresponding to the plurality of unadhered barrier walls 360) by the photolithographic method to form the plurality of unadhered barrier walls 360 on the inner surface of the lower electrode substrate 310 through the orientation film 315. However, the height of the individual unadhered barrier walls 360 is made smaller by a predetermined length (e.g., 0.3 microns) than that of the individual adhered barrier walls 350. Here, the individual unadhered barrier walls 360 is as wide as the adhered barrier walls 350.

Here, the height of the unadhered barrier walls 360, the number of the unadhered barrier walls 360 between the two individual adhered barrier walls 350, and the space between the two individual adhered barrier walls 350 are set to retain such a low rigidity as to make it easy to narrow the spaces of the electrode substrate 320 between the two individual adhered barrier walls 350 and between the individual unadhered barrier walls 360 between the two individual adhered barrier walls 350.

By making the space proper between the two individual adhered barrier walls 350, moreover, the conditions for forming the individual unadhered barrier walls 360 are so set as to make constant the ratio of individual dielectric constants (i.e., the specific dielectric constant) between the pixel regions corresponding to the individual adhered barrier walls 350 and the pixel regions corresponding to the individual unadhered barrier walls 360, and to suppress the orientation disturbance of the smectic liquid crystal 330 even the liquid crystal cell is pushed while it is used. However, it is conditioned that the plurality of adhered barrier walls 350 perform the aforementioned functions.

At a next superposing step S307, moreover, the two electrode substrates 310 and 320 are superposed through the seal 340 and the plurality of adhered barrier walls 350. In this case, the two electrode substrates 310 and 320 are superposed so that the individual orientation directions of the two orientation films 315 and 327 may be in parallel with the longitudinal direction of the individual adhered barrier walls 350. This superposition forms a space between each unadhered barrier wall 360 and the orientation film 327 of the upper electrode substrate 320.

Next, the treatment of a heating and pressing step S308 is taken in the following manner.

The two electrode substrates 310 and 320 thus superposed are arranged in a heating and pressing apparatus, and the inside of this apparatus is heated by a heater.

After this, a pressure is applied between the two electrode substrates 310 and 320 by the heating and pressing apparatus. At this time, the pressure is 0.9 $Kg/cm^2$, and the heating temperature is 190° C. In this state, the two electrode substrates 310 and 320 are kept for 60 minutes. After this, the inside of the heating and pressing apparatus is returned to the room temperature and the atmospheric pressure by a slow cooling.

Here will be described the treatment of a liquid crystal filling step S309.

At this liquid crystal filling step S309, the two electrode substrates 310 and 320, as treated at the heating and pressing step S308, are contained in a vacuum container, and the inside of this vacuum container is evacuated for about 2 hours. As a result, the region between the two electrode substrates 310 and 320 is likewise evacuated.

Next, the two electrode substrates 310 and 320 are heated to about 120° C. In this state, a smectic liquid crystal is dripped to the portion in the vicinity of the liquid crystal filling port 341 of the electrode substrate 310. Accordingly, the smectic liquid crystal softens to plug the liquid crystal filling port 341 of the seal 340.

In this state, the inside of the vacuum container is returned to the atmospheric pressure, and this atmospheric state is kept for 12 hours. At this stage, according to the differential pressure between the region between the two electrode substrates 310 and 320 and the outside of the two electrode substrates 310 and 320, the smectic liquid crystal is sucked to fill the two electrode substrates 310 and 320 through the liquid crystal filling port 341 of the seal 340. Thus, the filling of the liquid crystal cell with the smectic liquid crystal is ended.

After this, at a cooling step S310, the liquid crystal cell filled with the smectic liquid crystal is cooled to the room temperature. Here, the portion of the liquid crystal cell excepting the smectic liquid crystal is called the "cell structure".

Since the coefficient of thermal expansion of the smectic liquid crystal is considerably higher than that of the cell structure, the volume shrinkage of the smectic liquid crystal is larger than that of the cell structure, at the cooling step for the liquid crystal cell.

As a result, the smectic liquid crystal shrinks apart from one of the individual orientation films of the two electrode substrates 310 and 320. Accordingly, a stress for the action of the adhesion is generated in the smectic liquid crystal between the smectic liquid crystal and the orientation film to be left by the liquid crystal.

As described above, however, the space between the two individual adhered barrier walls 350 is properly set, and the three unadhered barrier walls 360 are individually formed between the two individual adhered barrier walls 350. The individual unadhered barrier walls 360 are so lower than the individual adhered barrier walls 350 that they are not adhered to the orientation film 327 of the electrode substrate 320.

This means that the space between the electrode substrate 320 and the unadhered barrier walls 360 in the portion of the electrode substrate 320 between the two individual adhered barrier walls 350 is enlarged to lower the rigidity thereby to facilitate the elastic deformation of the portion between the two individual adhered barrier walls 350.

As there arises a difference in the volume shrinkage between the cell structure and the smectic liquid crystal in the cooling procedure, the portion of the electrode substrate 320 between the two individual adhered barrier walls 350 easily deforms elastically toward the individual unadhered barrier walls 360, for example, so that the space between the two electrode substrates 310 and 320 narrows according to the volume shrinkage of the liquid crystal layer of the smectic liquid crystal. As a result, it is possible to prevent in advance the occurrence of the orientation defect which will be caused in the liquid crystal layer of the smectic liquid crystal by the aforementioned stress.

This prevention can be likewise achieved even if the aforementioned volume shrinkage difference is large, by the properly following elastic deformation of the portion of the electrode substrate 320 between the two individual adhered barrier walls 350.

Since the ratio of the individual dielectric constants (i.e., the specific dielectric constant) between the pixel regions corresponding to the individual adhered barrier walls 350 and the pixel regions corresponding to the individual unadhered barrier walls 360 is set substantially constant, a display defect in a black streak, as might otherwise be caused by the dispersion of the specific dielectric constant due to the excessive space between the two individual adhered barrier walls 350, can be eliminated at the display time of the liquid crystal cell.

Here, it is natural that the individual adhered barrier walls 350 have a rigidity sufficient as spacers for keeping proper the space between the two electrode substrates 310 and 320.

After this, the liquid crystal filling port 341 of the seal 340 is sealed up at a sealing step S311. Thus, the manufacture of the liquid crystal cell is ended.

Figure 21:
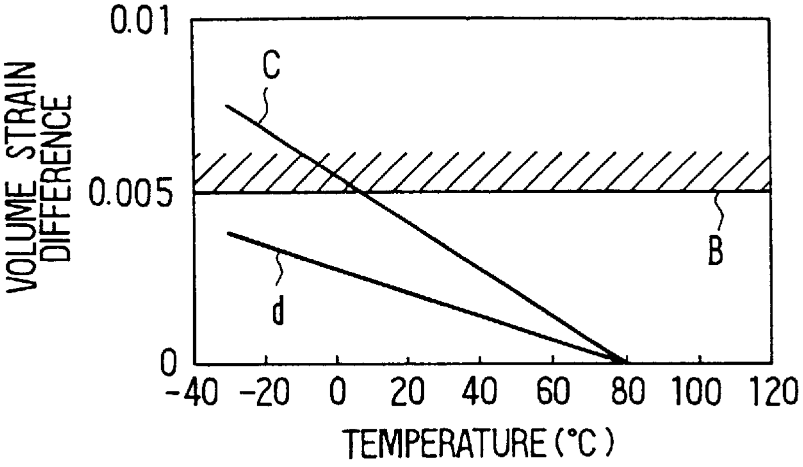
FIG. 21 is a graph plotting a relation of a volume strain difference and a temperature between a cell structure and a smectic liquid crystal in the liquid crystal cell of the sixth embodiment and a conventional liquid crystal cell.
Figure 22:
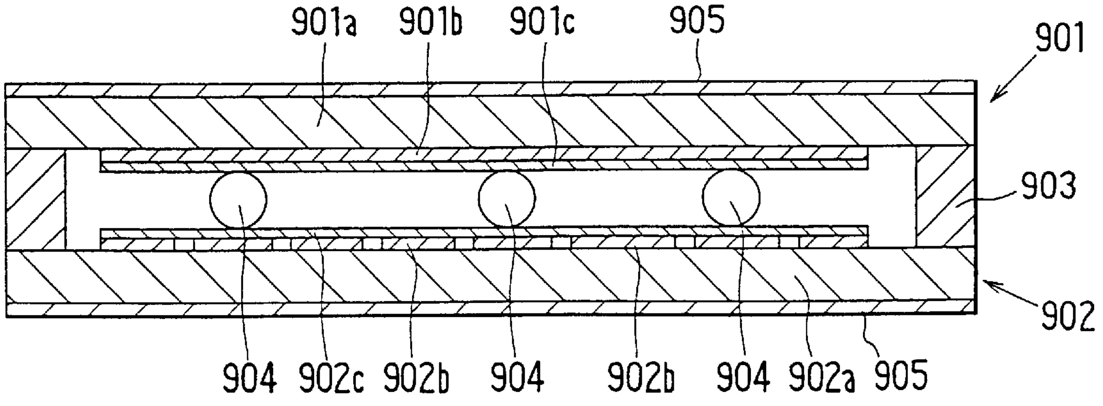
FIG. 22 is a schematic section of a conventional liquid crystal cell.

Here, FIG. 21 shows differences of the volume strains of the cell structure and the smectic liquid crystal between the liquid crystal cell which is equipped with the individual adhered barrier walls 350 and the individual unadhered barrier walls 360, and the conventional liquid crystal cell in which the unadhered barrier walls have a construction similar to that of the adhered barrier walls. Here, the condition for filling the smectic liquid crystal is based on the reference of 80° C. The conventional liquid crystal cell has been exemplified by the liquid crystal cell, as shown in FIG. 23.

In FIG. 21, a "graph c" illustrates the case of the conventional liquid crystal cell, and a "graph d" illustrates the case of the liquid crystal cell of this embodiment.

According to this figure, since the smectic liquid crystal filling condition is 80° C., the volume strain difference between the conventional liquid crystal cell and the liquid crystal cell of this embodiment at 80° C. is zero.

As the temperature lowers, however, the volume strain difference between the liquid crystal cells of the prior art and this embodiment becomes larger with increasing their discrepancy.

It is also found that the volume strain difference of the conventional liquid crystal cell exceeds an allowable limit value B as the temperature lowers, whereas the volume strain difference of the liquid crystal cell of this embodiment does not exceed even when the temperature lowers. Here, the allowable limit value B is exemplified by the lower limit of 0.005, at which a stress for causing the orientation defect in the smectic liquid crystal is generated.

As found by comparing the two graphs of FIG. 21, the rigidity of the liquid crystal cell of this embodiment is lowered by the aforementioned sectional structure of the barrier walls. Therefore, the volume strain difference is kept at the low level even when the temperature drops. As a result, no orientation defect occurs in the smectic liquid crystal even when the temperature drops to −30° C. In the conventional liquid crystal cell, on the contrary, the orientation defect occurs at about 5° C. because of the high rigidity.

Here, when the present invention is to be practiced, the number of and the space between the unadhered barrier walls 360 between the two adhered barrier walls 350 may be suitably changed.

What is claimed is:

1. A liquid crystal cell comprising:

a pair of electrode substrates;

a band seal interposed between said electrode substrates at the peripheral edges of the same;

a plurality of barrier walls clamped on the inner peripheral side of said seal and between said electrode substrates in parallel with each other; and a liquid crystal filling between said electrode substrates via said seal, wherein each of said plurality of barrier walls is made of a single material and has a lower rigidity in at least one portion of each barrier wall than that of other portions of each said barrier wall.

2. A liquid crystal cell according to claim 1, wherein each of said plurality of barrier walls has at least first and second barrier walls in a laminar shape having different rigidities in its height direction.

3. A liquid crystal cell comprising:

a pair of electrode substrates;

a band seal interposed between said electrode substrates at the peripheral edges of the same;

a plurality of barrier walls clamped on the inner peripheral side of said seal and between said electrode substrates in parallel with each other; and a liquid crystal filling between said electrode substrates via said seal, wherein each of said plurality of barrier walls has a lower rigidity in at least one portion of each barrier wall than that of other portions of each said barrier wall, wherein each of said plurality of barrier walls has at least first and second barrier walls in a laminar shape having different rigidities in its height direction, and wherein each of said barrier walls and said first barrier wall portion is positioned on the side of the inner surface of one of said electrode substrates, whereas said second barrier wall portion is positioned between the inner surface of the other electrode substrate and said first barrier wall portion and has a lower rigidity than said first barrier wall portion.

4. A liquid crystal cell according to claim 3, wherein said individual second barrier wall portions are a pair of projections formed along the two widthwise side portions of the corresponding one of said first barrier wall portions and made narrower than said first barrier wall portions.

5. A liquid crystal cell according to claim 3, wherein said individual second barrier wall portions are made narrower than the corresponding first barrier wall portions.

6. A liquid crystal cell according to claim 1, wherein:

said liquid crystal has a high viscosity at the room temperature and fills between said electrode substrates via said seal by being softened, and one of said electrode substrates has a plurality of electrodes in parallel with each other, whereas the other electrode substrate has a plurality of electrodes positioned in parallel with each other to intersect the plurality of electrodes of said one electrode substrate.

7. A liquid crystal cell according to claim 6, wherein each of said plurality of barrier walls has at least first and second barrier walls having different rigidities in its height direction, and arranged in a laminar shape and in parallel with the plurality of one of said electrode substrates.

8. A liquid crystal cell according to claim 6, wherein:

one of said electrode substrates includes a plurality of color filter layers positioned to extend in the longitudinal direction of or intersect said plurality of electrodes, and a shading layer interposed between the adjoining two of said color filter layers, and each of said plurality of barrier walls has at least first and second barrier wall portions having different rigidities in its height direction, and arranged in a laminar shape and in parallel with the plurality of electrodes of one of said electrode substrates.

9. A liquid crystal cell according to claim 1, wherein:

said liquid crystal has a high viscosity at the room temperature and fills, between said electrode substrates via said seal by being softened, one of said electrode substrates has a plurality of main electrodes in parallel with each other and a plurality of auxiliary electrodes positioned to face the faces of said plurality of main electrodes in the longitudinal direction of the same, whereas the other electrode substrate has a plurality of electrodes positioned in parallel with each other to intersect said plurality of main electrodes, and each of said plurality of barrier walls has at least first and second barrier wall portions having different rigidities in its height direction and arranged in a laminar shape and in parallel with the plurality of electrodes of one of said electrode substrates.

10. A liquid crystal cell comprising:

a pair of electrode substrates;

a band seal interposed between said electrode substrates at the peripheral edges of the same;

a plurality of barrier walls clamped on the inner peripheral side of said seal and between said electrode substrates in parallel with each other; and a liquid crystal filling between said electrode substrates via said seal, wherein each of said plurality of barrier walls has a lower rigidity in at least one portion of each barrier wall than that of other portions of each said barrier wall, said liquid crystal has a high viscosity at the room temperature and fills, between said electrode substrates via said seal by being softened, one of said electrode substrates has a plurality of main electrodes in parallel with each other and a plurality of auxiliary electrodes positioned to face the faces of said plurality of main electrodes in the longitudinal direction of the same, whereas the other electrode substrate has a plurality of electrodes positioned in parallel with each other to intersect said plurality of main electrodes, each of said plurality of barrier walls has at least first and second barrier wall portions having different rigidities in its height direction and arranged in a laminar shape and in parallel with the plurality of electrodes of one of said electrode substrates, said other electrode substrate includes a color filter layer positioned along the longitudinal direction of the individual main electrodes of said one electrode substrate, and a black mask layer positioned between the adjoining individual two of said color filter layers, the adjoining two of the auxiliary electrodes of said one electrode substrate are individually buried in the two side portions of the corresponding one of said main electrodes, and each of said barrier walls comprises:

a first barrier wall portion formed on the inner surface of said one electrode substrate so as to correspond to the individual facing side portions of the adjoining two of said main electrodes; and a second barrier wall portion formed between said first barrier wall portion and the portion of the inner surface of said other electrode substrate, as facing the facing side portion of the adjoining two of said color filter layers, and having a pair of projections less rigid than said first barrier wall portion and corresponding to the individual facing side portions of the adjoining two of said color filter layers.

11. A liquid crystal cell, comprising:

a pair of electrode substrates;

a band seal interposed between said electrode substrates at the peripheral edges of the same;

a plurality of barrier walls clamped on the inner peripheral side of said seal and between said electrode substrates in parallel with each other; and a liquid crystal filling between said electrode substrates via said seal, wherein each of said plurality of barrier walls has a lower rigidity in at least one portion of each barrier wall than that of other portions of each said barrier wall, said liquid crystal has a high viscosity at the room temperature and fills, between said electrode substrates via said seal by being softened, one of said electrode substrates has a plurality of main electrodes in parallel with each other and a plurality of auxiliary electrodes positioned to face the faces of said plurality of main electrodes in the longitudinal direction of the same, whereas the other electrode substrate has a plurality of electrodes positioned in parallel with each other to intersect said plurality of main electrodes, each of said plurality of barrier walls has at least first and second barrier wall portions having different rigidities in its height direction and arranged in a laminar shape and in parallel with the plurality of electrodes of one of said electrode substrates, said other electrode substrate includes a color filter layer positioned along the longitudinal direction of the individual main electrodes of said one electrode substrate, and a black mask layer positioned between the adjoining individual two of said color filter layers, the individual auxiliary electrodes of one of said one electrode substrate are buried in the widthwise centers and in the longitudinal direction of said individual main electrodes, and each of said barrier walls comprises:

a first barrier wall portion so formed on the inner surface of said one electrode substrate as to correspond to the widthwise central portions of said main electrodes; and a second barrier wall portion formed between said first barrier wall portion and the portion of the inner surface of said other electrode substrate, as corresponding to said color filter layers, and made less rigid and narrower than said first barrier wall portion.

12. A liquid crystal cell according to claim 11, wherein said individual second barrier portions are a plurality of barrier wall portions positioned in the longitudinal direction and at a space from each other.

13. A liquid crystal cell according to claim 1, wherein said one portion having the lower rigidity serves as an absorbing member to absorb change in volume of the liquid crystal.

14. A liquid crystal cell according to claim 1, wherein said one portion having the lower rigidity has a gap.

15. A liquid crystal cell according to claim 14, wherein said gap is disposed between protrusions.

16. A liquid crystal cell according to claim 1, wherein said one portion having the lower rigidity has a width narrower than that of said other portions.

17. A liquid crystal cell comprising:

a first electrode substrate;

a second electrode substrate;

a seal member arranged to form a liquid crystal filling space between said first electrode substrate and said second electrode substrate;

a plurality of barrier walls arranged in said liquid crystal filling space at a kept space from each other and in parallel with each other for dividing said liquid crystal filling space into a plurality of divided spaces;

a liquid crystal filling the divided spaces and having a correlation between a temperature change and a volume change; and an absorbing member that absorbs the volume change of said liquid crystal provided at said plurality of barrier walls, wherein said plurality of barrier walls have predetermined rigidity, and said absorbing member includes a plurality of low-rigidity portions provided at said plurality of barrier walls, each of said lower rigidity portions having a lower rigidity than said predetermined rigidity.

18. A liquid crystal cell comprising:

a first electrode substrate;

a second electrode substrate;

a seal member arranged to form a liquid crystal filling space between said first electrode substrate and said second electrode substrate;

a plurality of barrier walls arranged in said liquid crystal filling space at a kept space from each other and in parallel with each other for dividing said liquid crystal filling space into a plurality of divided spaces; and a liquid crystal filling the divided spaces and having a correlation between a temperature change and a volume change, wherein each of said plurality of barrier walls includes one end to be contacted to said first electrode substrate and another end to be contacted to said second electrode substrate, each said one end of said plurality of barrier walls being contacted to said first electrode substrate, whereas several groups of the other ends of said plurality of barrier walls form non-contact regions for said second electrode substrate, and wherein said plurality of barrier walls have a predetermined height, and said non-contact regions of said several groups have low-height portions having a lower height than said predetermined height.

19. A process for manufacturing a liquid crystal cell, comprising:

a seal forming step of forming a seal in a band shape on an inner surface of one of two electrode substrates and along the outer peripheral portion of the same by to form a liquid crystal filling port;

a barrier wall forming step of forming a plurality of barrier walls in parallel with each other on the inner surface of one of said one electrode substrate and other electrode substrate;

a superposing step of superposing said two electrode substrates via said seal and said plurality of barrier walls so that said plurality of barrier walls may extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step, wherein at said barrier wall forming step, said plurality of barrier walls are individually formed in a laminar shape of a resist material as first and second barrier wall portions having different rigidities in their height direction on the inner surface of said one or other electrode substrate.

20. A process for manufacturing a liquid crystal cell, comprising:

an electrode substrate forming step of forming two electrode substrates;

a seal forming step of forming a seal in a band shape on the inner surface of one of two electrode substrates and along the outer peripheral portion of the same thereby to form a liquid crystal filling port;

a barrier wall forming step of forming a plurality of barrier walls of a resist material by a patterning treatment in parallel with each other on the inner surface of one of said electrode substrate and the other electrode substrate;

a superposing step of superposing said two electrode substrates via said seal and said plurality of barrier walls so that said plurality of barrier walls extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step, wherein at said electrode substrate forming step, one of said electrode substrates is formed to package a plurality of electrodes parallel to each other therein, whereas the other electrode substrate is formed to package a plurality of electrodes positioned to extend in parallel with each other and intersect said plurality of electrode substrates, and wherein said barrier wall forming step includes forming a barrier wall portion and forming at its two widthwise side portions a pair of projections projecting to the inner surface of the other electrode substrate.

21. A process for manufacturing a liquid crystal cell, comprising:

an electrode substrate forming step of forming two electrode substrates;

a seal forming step of forming a seal in a band shape on the inner surface of one of two electrode substrates and along the outer peripheral portion of the same thereby to form a liquid crystal filling port;

a barrier wall forming step of forming a plurality of barrier walls of a resist material by a patterning treatment in parallel with each other on the inner surface of one of said one electrode substrate and other electrode substrate;

a superposing step of superposing said two electrode substrates via said seal and said plurality of barrier walls so that said plurality of barrier walls extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step, wherein at said electrode substrate forming step, one of said electrode substrates is formed to package a plurality of main electrodes parallel to each other and auxiliary electrodes over the liquid crystal side faces of said main electrodes and along their widthwise central portions therein, whereas the other electrode substrate is formed to package a plurality of electrodes positioned to extend in parallel with each other and intersect said plurality of main electrodes, and wherein at said barrier wall forming step, for each of said barrier walls, a barrier wall portion is formed by burying the portion of the inner surface of one of said electrode substrates, as corresponding to said auxiliary electrodes, between the two widthwise end portions, whereas a barrier wall portion is formed at the widthwise central portion to protrude to the inner surface of said other electrode substrate.

22. A process for manufacturing a liquid crystal cell, comprising:

an electrode substrate forming step for forming two electrode substrates;

a seal forming step of forming a seal in a band shape on the inner surface of one of two electrode substrates and along the outer peripheral portion of the same thereby to form a liquid crystal filling port;

a barrier wall forming step of forming a plurality of barrier walls of a resist material by a patterning treatment in parallel with each other on the inner surface of one of said one electrode substrate and other electrode substrate;

a superposing step of superposing said two electrode substrates via said seal and said plurality of barrier walls so that said plurality of barrier walls extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step, wherein at said electrode substrate forming step, one of said electrode substrates is formed to package a plurality of electrodes parallel to each other, whereas the other electrode substrate is formed to package a plurality of electrodes positioned to extend in parallel with each other and intersect said plurality of electrodes, wherein at said barrier wall forming step, said plurality of barrier walls are formed to include: a plurality of first barrier wall portions patterned of a resist material to face the inner surface of said one electrode substrate along the plurality of electrodes of said electrode substrate; and a plurality of second barrier wall portions patterned of a resist material with a smaller width than that of said first barrier wall portions and positioned to face the inner surface of said other electrode substrate along said plurality of first barrier wall portions, and wherein at said superposing step, said two electrode substrates are superposed to superpose said first barrier wall portions individually on the corresponding second barrier wall portions.

23. A liquid crystal cell manufacturing process according to claim 22, wherein at said barrier wall forming step, for each of said barrier walls, said second barrier wall portions are formed as a plurality of spaced barrier wall portions in the longitudinal direction.

24. A process for manufacturing a liquid crystal cell, comprising:

a seal forming step of forming a seal in a band shape on an inner surface of one of two electrode substrates and thereby forming a liquid crystal filling port along the outer peripheral;

a barrier wall forming step of forming a plurality of support barrier walls in parallel with each other on the inner surface of said one electrode substrate and for forming at least one seated barrier wall lower than said support barrier walls and in parallel on the inner surface of said other electrode substrate in the regions corresponding to the region between said two support barrier walls;

a superposing step of superposing said two electrode substrates via said seal and said plurality of support barrier walls so that said plurality of support barrier walls may extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step.

25. A process for manufacturing a liquid crystal cell, comprising:

an electrode substrate forming step of forming one electrode substrate to package a plurality of electrodes parallel to each other therein and the other electrode substrate to package a plurality of electrodes positioned to extend in parallel with each other and intersect the first-named plurality of electrodes;

a seal forming step of forming a seal in a band shape on an inner surface of one of two electrode substrates and along the outer peripheral portion of the same thereby to form a liquid crystal filling port;

a barrier wall forming step of forming a plurality of support barrier walls in parallel with each other on the inner surface of said one electrode substrate, and for forming at least one seated barrier wall lower than said support barrier walls and in parallel on the inner surface of said other electrode substrate in the regions corresponding to the region between said two support barrier walls;

a superposing step of superposing said two electrode substrates via said seal and said plurality of support barrier walls so that said plurality of support barrier walls may extend on the inner peripheral side of said seal from said liquid crystal filling port to the facing portion of said seal facing said liquid crystal filling port;

a heating and pressing step of heating and pressing said two electrode substrates, after the superposing step;

a liquid crystal filling step of filling a liquid crystal having a high viscosity at the room temperature in a softened state between said two electrode substrates through said liquid crystal filling port, after the heating and pressing step; and a cooling step of cooling said liquid crystal after the liquid crystal filling step.

* * * * *